(12) United States Patent
Bhatnagar et al.

(10) Patent No.: US 9,311,297 B2
(45) Date of Patent: Apr. 12, 2016

(54) METHOD AND SYSTEM FOR OUTPUTTING INFORMATION

(71) Applicants: Prateek Bhatnagar, Windsor, CA (US); Parth Khanna, Brampton, CA (US)

(72) Inventors: Prateek Bhatnagar, Windsor, CA (US); Parth Khanna, Brampton, CA (US)

( * ) Notice: Subject to any disclaimer, the term of this patent is extended or adjusted under 35 U.S.C. 154(b) by 292 days.

(21) Appl. No.: 13/802,792

(22) Filed: Mar. 14, 2013

(65) Prior Publication Data

US 2014/0282030 A1 Sep. 18, 2014

(51) Int. Cl.
*G06F 17/27* (2006.01)
*G06F 3/0484* (2013.01)

(52) U.S. Cl.
CPC .......... *G06F 17/2795* (2013.01); *G06F 3/0484* (2013.01); *G06F 17/27* (2013.01)

(58) Field of Classification Search
CPC .............. G06F 17/2735; G06F 17/274; G06F 17/2765; G06F 17/277; G06F 17/2775; G06F 17/2785; G06F 17/2795
USPC ................ 704/9, 10, 257; 715/260, 259, 738
See application file for complete search history.

(56) References Cited

U.S. PATENT DOCUMENTS

| | | | | |
|---|---|---|---|---|
| 5,128,865 A | * | 7/1992 | Sadler | 704/2 |
| 6,070,134 A | * | 5/2000 | Richardson et al. | 704/9 |
| 6,076,051 A | * | 6/2000 | Messerly et al. | 704/9 |
| 6,078,878 A | * | 6/2000 | Dolan | 704/9 |
| 6,625,608 B1 | * | 9/2003 | Watanabe | |
| 7,124,364 B2 | * | 10/2006 | Rust et al. | 715/260 |
| 7,143,348 B1 | * | 11/2006 | Krause | 715/236 |
| 7,600,186 B2 | * | 10/2009 | Saha et al. | 715/260 |
| 7,890,521 B1 | * | 2/2011 | Grushetskyy et al. | 707/755 |
| 8,335,791 B1 | * | 12/2012 | Goldstein et al. | 707/739 |
| 2003/0004706 A1 | * | 1/2003 | Yale et al. | 704/9 |
| 2003/0067498 A1 | * | 4/2003 | Parisi | 345/853 |
| 2004/0133418 A1 | * | 7/2004 | Turcato et al. | 704/9 |
| 2008/0275694 A1 | * | 11/2008 | Varone | 704/9 |
| 2009/0006359 A1 | * | 1/2009 | Liao | 707/5 |
| 2009/0240714 A1 | * | 9/2009 | Keith et al. | 707/100 |
| 2011/0107206 A1 | * | 5/2011 | Walsh et al. | 715/256 |
| 2011/0251839 A1 | * | 10/2011 | Achtermann et al. | 704/9 |
| 2012/0005616 A1 | * | 1/2012 | Walsh et al. | 715/776 |
| 2012/0079372 A1 | * | 3/2012 | Kandekar et al. | 715/256 |
| 2014/0067832 A1 | * | 3/2014 | Lamba et al. | 707/750 |
| 2014/0089316 A1 | * | 3/2014 | Krause | 707/741 |
| 2014/0249799 A1 | * | 9/2014 | Yih et al. | 704/9 |
| 2014/0331125 A1 | * | 11/2014 | Tigchelaar | 715/249 |

* cited by examiner

*Primary Examiner* — John Villecco

(57) ABSTRACT

A computer-implemented method comprising: receiving a selection of an input via an input device; transmitting the selection of the input via a communication device; receiving a first key phrase via the communication device, the first key phrase being included in the input; receiving a second key phrase via the communication device, the second key phrase being included in the input; receiving a relation identifier via the communication device, the relation identifier identifying a relation between the first key phrase and the second key phrase; and outputting the first key phrase, the second key phrase, and a relation indicator via an output device, the relation indicator indicating the relation between the first key phrase and the second key phrase.

31 Claims, 25 Drawing Sheets

METHOD AND SYSTEM FOR OUTPUTTING INFORMATION

TECHNICAL FIELD

The following relates generally to systems and methods for outputting information associated with an input.

BACKGROUND

A textbook or a course book is a manual or instruction in any branch of study. Traditionally, most textbooks were only published in printed format, however, many textbooks are now available as online electronic textbooks. Electronic textbooks can be downloaded to a computer, a laptop, a tablet device, or a smart phone. Some electronic textbooks are also searchable.

Many individuals find it difficult to read a textbook and understand the concepts in the textbook. Reading a textbook can be difficult because textbooks primarily contain strings of words, whereas some individuals are visual learners and prefer to learn in a visual manner. Furthermore, textbooks are dense and thick, so reading them can be a very laborious and time-consuming activity.

Since reading a textbook can be time-consuming, some individuals prefer to read textbook notes or course notes that can be abridged versions of the textbook and explain the material using fewer words and pages. However, like textbooks, most textbook notes or course notes primarily contain strings of words and therefore suffer from many of the same shortcomings of a textbook. Some individuals read notes that they hastily prepared during a lecture, notes they received from a friend, or notes they downloaded from the Internet or from a notes marketplace. Such notes can be inaccurate, incomplete or incomprehensible.

SUMMARY

A computer-implemented method comprising: receiving a selection of an input via an input device; transmitting the selection of the input via a communication device; receiving a first key phrase via the communication device, the first key phrase being included in the input; receiving a second key phrase via the communication device, the second key phrase being included in the input; receiving a relation identifier via the communication device, the relation identifier identifying a relation between the first key phrase and the second key phrase; and outputting the first key phrase, the second key phrase, and a relation indicator via an output device, the relation indicator indicating the relation between the first key phrase and the second key phrase.

BRIEF DESCRIPTION OF FIGURES

Embodiments will now be described by way of example only with reference to the figures wherein.

DETAILED DESCRIPTION

Figure 1:
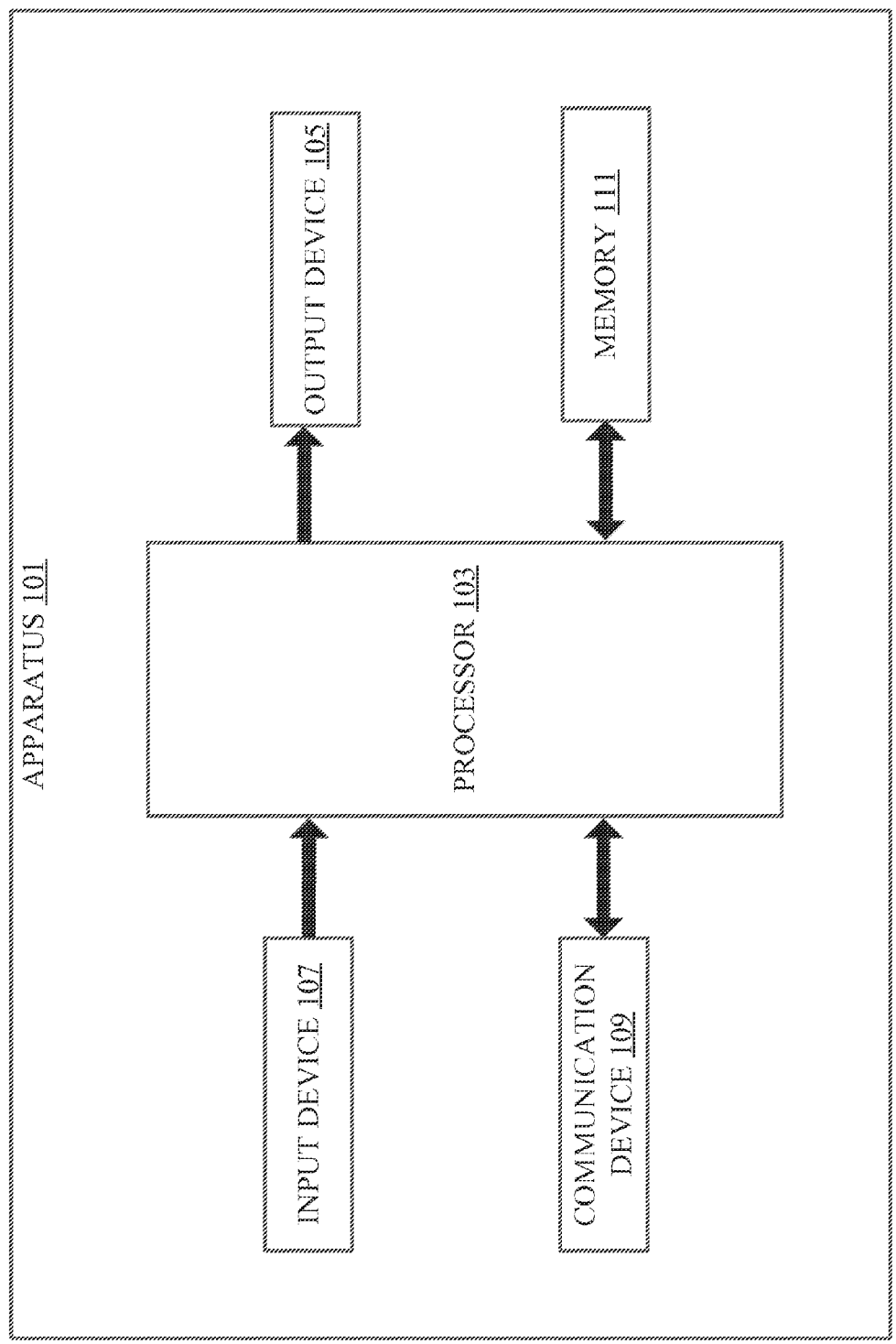
FIG. 1 is a block diagram illustrating an example apparatus.

An electronic communication apparatus comprising: an input device; an output device; a memory; a communication device; and a processor coupled with the input device, the output device, the memory and the communication device, the processor being configured to display a user interface via the output device, receive an input via the input device, identify a first key phrase in the input, identify a second key phrase in the input, identify a relation between the first key phrase and the second key phrase, output the first key phrase via the output device, output the second key phrase via the output device, and output a relation indicator to indicate the relation between the first key phrase and the second key phrase.

In an example embodiment, the processor is configured to identify the first key phrase in response to the first key phrase matching a phrase stored in the memory.

In another example embodiment, the processor is configured to identify the first key phrase in response to a first occurrence of the first key phrase being within a first portion of the input. In an example embodiment, the first portion comprises a beginning portion of the input. In another example embodiment, the first portion of the input includes phrases from the beginning of the input to a first percentage of the input. In an example embodiment, the first percentage includes about one percent to twenty five percent.

In another example embodiment, the processor is configured to identify the first key phrase in response to a last occurrence of the first key phrase being within a second portion of the input. In an example embodiment, the second portion of the input comprises an end portion of the input. In another example embodiment, the second portion of the input includes phrases from a second percentage of the input to the end of the input. In an example embodiment, the second percentage includes about seventy five percent to ninety nine percent.

In another example embodiment, the processor is configured to identify the first key phrase in response to the first key phrase being semantically related to another phrase in the input. In an example embodiment, the processor is configured to transmit a request for phrases that are semantically related to the first key phrase, receive one or more phrases in response to the request, and determine whether the one or more received phrases matches another phrase in the input.

In another example embodiment, the processor is configured to identify the first key phrase based on a length of the first key phrase.

In another example embodiment, the processor is configured to identify the first key phrase based on a number of occurrences of the first key phrase in the input.

In another example embodiment, the processor is further configured to receive a domain identifier identifying a domain corresponding with the input. In another example embodiment, the processor is further configured to identify a domain corresponding to the input. In an example embodiment, the processor is configured to identify the domain in response to one or more phrases in the input matching one or more phrases in a domain data store. In an example embodiment, the processor is configured to identify the first key phrase in response to the first key phrase matching a phrase in a domain data store.

In an example embodiment, the processor is configured to identify the second key phrase by selecting a phrase in the input that is a cognitive synonym of the first key phrase. In an example embodiment, the processor is configured to identify the second key phrase by transmitting the first key phrase, requesting one or more cognitive synonyms of the first key phrase via the communication device, receiving the one or more cognitive synonyms of the first key phrase via the communication device, and determining whether the second key phrase matches the one or more cognitive synonyms. In an example embodiment, the cognitive synonyms of the first key phrase comprise one or more of a hypernym, a hyponym, a holonym, a meronym, a sister term, a derivationally related phrase and a synonym of the first key phrase.

In an example embodiment, the relation comprises a semantic relation.

In an example embodiment, the processor is configured to identify the relation between the first key phrase and the second key phrase by requesting a lexical database for one or more cognitive synonyms of the first key phrase via the communication device, receiving the one or more cognitive synonyms of the first key phrase from the lexical database via the communication device, and determining whether the second key phrase matches at least one of the cognitive synonyms of the first key phrase.

In another example embodiment, the processor identifies the relation between the first key phrase and the second key phrase as a hyponymous relation in response to the second key phrase matching a hyponym of the first key phrase.

In another example embodiment, the processor identifies the relation between the first key phrase and the second key phrase as a meronymy relation in response to the second key phrase matching a meronym of the first key phrase.

In another example embodiment, the processor identifies the relation between the first key phrase and the second key phrase as a holonymy relation in response to the second key phrase matching a holonym of the first key phrase.

In another example embodiment, the processor identifies the relation between the first key phrase and the second key phrase as an antonymy relation in response to the second key phrase matching an antonym of the first key phrase.

In another example embodiment, the processor identifies the relation between the first key phrase and the second key phrase as a homonymy relation in response to the second key phrase matching a homonym of the first key phrase.

In another example embodiment, the processor identifies the relation between the first key phrase and the second key phrase as a hypernymous relation in response to the second key phrase matching a hypernym of the first key phrase.

In another example embodiment, the processor identifies the relation between the first key phrase and the second key phrase as a synonymy relation in response to the second key phrase matching a synonym of the first key phrase.

In another example embodiment, the processor identifies the relation between the first key phrase and the second key phrase as a locative relation in response to the first key phrase matching a location and the second key phrase matching an entity in or adjacent to the location.

In another example embodiment, the processor identifies the relation between the first key phrase and the second key phrase as a temporal relation in response to the first key phrase matching a time or a time period and the second key phrase matching an event that occurred within the time period or proximate to the time period or the time.

In another example embodiment, the processor identifies the relation between the first key phrase and the second key phrase as a causal relation in response to the first key phrase matching a trigger condition and the second key phrase matching a result condition resulting from the trigger condition.

In another example embodiment, the processor identifies the relation between the first key phrase and the second key phrase as an instance-of relation in response to the second key phrase matching an entity that is an instance of an entity associated with the first key phrase.

In another example embodiment, the processor is further configured to display a portion of the input including the first key phrase, the second key phrase and other phrases in the input, and annotate the first key phrase and the second key phrase so that the first key phrase and the second key phrase appear different from the other phrases of the input that are displayed.

In another example embodiment, the processor is configured to annotate the first key phrase and the second key phrase by highlighting the first key phrase and the second key phrase, or by displaying the first key phrase and the second key phrase with a different typography than the other phrases of the input that are displayed.

In another example embodiment, the relation indicator comprises an elongated member having a first end portion and a second end portion, the first end portion being proximate to the first key phrase and the second end portion being proximate to the second key phrase.

In another example embodiment, the relation indicator comprises a line connecting the first key phrase with the second key phrase.

In another example embodiment, the relation indicator comprises an arrowhead when the relation between the first key phrase and the second key phrase includes a causal relation.

In another example embodiment, the relation indicator comprises a relation string that indicates the relation between the first key phrase and the second key phrase. In an example embodiment, the processor is configured to select the relation string from a plurality of relation strings. In an example embodiment, the processor is configured to select the relation string from the plurality of the relation strings by selecting the relation string that corresponds with the relation between the first key phrase and the second key phrase.

In another example embodiment, the processor is configured to select the relation string from the plurality of the relation strings by, for each relation string, computing a corresponding concatenated relation string by concatenating the first key phrase, the relation string and the second key phrase, computing a fluency value for each concatenated relation string, identifying the concatenated relation string with the highest fluency value, and selecting the relation string corresponding with the concatenated relation string having the highest fluency value.

In another example embodiment, the processor is configured to display a portion of the input including the first key phrase, the second key phrase and other phrases in the input, display the first key phrase in accordance with a first visual parameter, display the second key phrase in accordance with a second visual parameter, and display the other phrases in the input in accordance with a third visual parameter that is different from the first visual parameter and the second visual parameter. In an example embodiment, the first visual parameter comprises a first typeface, the second visual parameter comprises a second typeface, and the third visual parameter comprises a third typeface that is different from the first and second typeface.

In another example embodiment, the relation indicator comprises a concept map. In an example embodiment, the relation indicator comprises a concept map in response to the relation including at least one of a hyponymous relation, an instance-of relation, a meronymy relation, a holonymy relation, a paradigmatic relation, or a relation between a possessor and an object possessed by the possessor.

In another example embodiment, the relation indicator comprises a Venn diagram. In another example embodiment, the relation indicator comprises a Venn diagram in response to the relation including at least one of a meronymy relation, a holonymy relation, and a hyponymous relation.

In another example embodiment, in response to the relation including a locative relation, the relation indicator comprises a map with an object overlapping the map, the map corresponding with the first key phrase and the object overlapping the map corresponding with the second key phrase.

In another example embodiment, the relation indicator comprises a timeline in response to the relation including a temporal relation.

In another example embodiment, the relation indicator comprises a flow diagram including at least one arrowhead in response to the relation including a causal relation.

In another example embodiment, the relation indicator comprises an image, the image corresponding with the first key phrase, and a portion of the image corresponding with the second key phrase. In an example embodiment, the processor is configured to annotate the image to identify the portion of the image corresponding with the second key phrase. In an example embodiment, the image is displayed in response to the relation including at least one of a meronymy relation and a holonymy relation.

In another example embodiment, the processor is further configured to determine whether the first key phrase matches a phrase in an exam data store, and display a first testability indicator in response to the first key phrase matching a phrase in the exam data store.

In another example embodiment, the processor is further configured to determine whether the second key phrase matches a phrase in the exam data store, and display a second testability indicator in response to the second key phrase matching a phrase in the exam data store.

In another example embodiment, the exam data comprises one or more of number of occurrences of the first key phrase and the second key phrase in exams stored in the exam data store, and a percentage of exams in the exam data store in which the first key phrase and the second key phrase appeared.

In another example embodiment, the first testability indicator comprises the percentage of exams in which the first key phrase appeared and the second testability indicator comprises the percentage of exams in which the second key phrase appeared.

In another example embodiment, the first testability indicator is different from the second testability indicator in response to the number of occurrences of the first key phrase in the exams stored in the exam data store being different from the number of occurrences of the second key phrase in the exams stored in the exam data store.

In another example embodiment, the processor is further configured to retrieve a resource and output the resource via the output device. In an example embodiment, the processor is configured to retrieve the resource by querying a resource data store.

In an example embodiment, the processor is configured to retrieve the resource related to the first key phrase by querying the resource data store using the first key phrase.

In another example embodiment, the processor is configured to retrieve the resource related to the second key phrase by querying the resource data store using the second key phrase.

In another example embodiment, the processor is configured to retrieve the resource related to the first key phrase, the second key phrase and the relation between the first key phrase and the second key phrase by querying the resource data store using a concatenation of the first key phrase, a relation string, and the second key phrase.

In an example embodiment, the processor is configured to select the relation string from a plurality of relation strings by selecting the relation string that corresponds with the relation between the first key phrase and the second key phrase.

In another example embodiment, the resource related to the first key phrase and the second key phrase comprises text including both the first key phrase and the second key phrase.

In another example embodiment, the resource related to the first key phrase and the second key phrase comprises text including both the first key phrase and the second key phrase in a single sentence or a single paragraph.

In another example embodiment, the resource comprises at least one of an image, an audio resource, a video resource, a web resource, and a journal resource.

In an example embodiment, the input comprises a first sentence and a second sentence, the first sentence includes the first key phrase and the second sentence includes the second key phrase.

In another example embodiment, a portion of the input comprises a plurality of phrases with no syntactical limitations.

In another example embodiment, the portion of the input with no syntactical limitations includes the first key phrase and not the second key phrase. In an example embodiment, the portion of the input with no syntactical limitations includes the first key phrase and the second key phrase.

In an example embodiment, the input comprises at least one of a file, a link to a file, an electronic textbook, a link to an electronic textbook, an audio input, an audio book, a video input, a video lecture, and an image input.

In another example embodiment, the input comprises an audio input; and the processor is further configured to convert speech in the audio input to text.

In another example embodiment, the input comprises an image input; and the processor is further configured to identify characters in the image input via optical character recognition.

In another example embodiment, the input comprises a video input having an audio input portion and an image input portion; and the processor is further configured to convert speech in the audio input portion to text and identify characters in the image input portion via optical character recognition.

In an example embodiment, the user interface comprises a web user interface.

In an example embodiment, the electronic communication apparatus comprises one of a desktop computer, a laptop computer, a mobile communication device, a tablet, and a smart phone. In another example embodiment, the electronic communication apparatus comprises a server.

A computer-implemented method comprising: receiving a selection of an input via an input device; transmitting the selection of the input via a communication device; receiving a first key phrase via the communication device, the first key phrase being included in the input; receiving a second key phrase via the communication device, the second key phrase being included in the input; receiving a relation identifier via the communication device, the relation identifier identifying a relation between the first key phrase and the second key phrase; and outputting the first key phrase, the second key phrase, and a relation indicator via an output device, the relation indicator indicating the relation between the first key phrase and the second key phrase.

In an example embodiment, the method further comprising displaying a user interface on a display.

In an example embodiment, the receiving the selection of the input comprises receiving a document via a user interface, the document including a plurality of phrases.

In an example embodiment, the transmitting the selection of the input comprises transmitting the document to a server over a public network.

In an example embodiment, the method further comprising receiving a domain identifier identifying a domain corresponding with the input.

In an example embodiment, the first key phrase is a cognitive synonym of the second key phrase.

In an example embodiment, the relation between the first key phrase and the second key phrase comprises one or more of a hyponymous relation, a meronymy relation, a holonymy relation, an antonymy relation, a homonymy relation, a synonymy relation, a locative relation, a temporal relation, a causal relation and an instance-of relation.

In an example embodiment, the outputting comprises: displaying a portion of the input including the first key phrase, the second key phrase and other phrases in the input, and annotating the first key phrase and the second key phrase so that the first key phrase and the second key phrase appear different from the other phrases of the input that are displayed.

In an example embodiment, the annotating comprises highlighting the first key phrase and the second key phrase. In another example embodiment, the annotating comprises displaying the first key phrase and the second key phrase with a different typography than the other phrases in the input.

In another example embodiment, the outputting comprises: displaying the first key phrase on a display, displaying the second key phrase on the display, and displaying an elongated member having a first end portion and a second end portion, the first end portion being proximate to the first key phrase and the second end portion being proximate to the second key phrase.

In an example embodiment, outputting the relation indicator comprises displaying a line connecting the first key phrase with the second key phrase.

In another example embodiment, outputting the relation indicator comprises displaying an arrowhead when the relation between the first key phrase and the second key phrase includes a causal relation.

In another example embodiment, outputting the relation indicator comprises displaying a relation string that indicates the relation between the first key phrase and the second key phrase.

In another example embodiment, the outputting comprises: displaying a portion of the input including the first key phrase, the second key phrase and other phrases in the input, displaying the first key phrase in accordance with a first visual parameter, displaying the second key phrase in accordance with a second visual parameter, and displaying the other phrases in the input in accordance with a third visual parameter that is different from the first visual parameter and the second visual parameter.

In an example embodiment, the first, second and third visual parameters comprise corresponding first, second and third typefaces.

In an example embodiment, the outputting comprises displaying a concept map including the first key phrase and the second key phrase.

In another example embodiment, the outputting comprises displaying a Venn diagram including the first key phrase and the second key phrase.

In another example embodiment, the outputting comprises: displaying a map of a location corresponding with the first key phrase; and displaying an object, corresponding with the second key phrase, proximate to the location in the map.

In another example embodiment, the outputting comprises: displaying a timeline including a time corresponding with the first key phrase; and displaying an event, corresponding with the second key phrase, proximate to the time in the timeline.

In another example embodiment, the outputting comprises displaying a flow diagram including the first key phrase and the second key phrase when the relation is a causal relation.

In another example embodiment, the outputting comprises: displaying an image corresponding with the first key phrase; and annotating a portion of the image, the portion corresponding with the second key phrase.

In an example embodiment, the method further comprising displaying a testability indicator indicating the testability of the first key phrase in a test or an exam.

In another example embodiment, the method further comprising receiving the testability indicator via the communication device.

In another example embodiment, the method further comprising displaying another testability indicator indicating the testability of the second key phrase.

In an example embodiment, the testability indicator comprises a probability.

In an example embodiment, the method further comprising: receiving a resource via the communication device; and outputting the resource via the output device.

In an example embodiment, receiving the resource comprises receiving one or more of a video, a link to a video, a website address, an audio, a link to an audio, an excerpt from a website, a link to a journal article, and an excerpt from a journal article.

An electronic communication device comprising: an input device; a communication device; an output device; and a processor coupled with the input device, the communication device and the output device, the processor being configured to receive a selection of an input via the input device, transmit the selection of the input via the communication device, receive a first key phrase via the communication device, the first key phrase being included in the input; receive a second key phrase via the communication device, the second key phrase being included in the input, receive a relation identifier via the communication device, the relation identifier identifying a relation between the first key phrase and the second key phrase, and output the first key phrase, the second key phrase, and a relation indicator via the output device, the relation indicator indicating the relation between the first key phrase and the second key phrase.

In an example embodiment, the output device comprises a display; and wherein the processor is further configured to display a user interface on the display.

In another example embodiment, the processor is configured to receive the selection of the input by receiving a document via a user interface, the document including a plurality of phrases.

In another example embodiment, the processor is configured to transmit the selection of the input by transmitting the document to a server over a public network.

In another example embodiment, the processor is further configured to receive a domain identifier identifying a domain corresponding with the input.

In another example embodiment, the processor is configured to output the first key phrase, the second key phrase and the relation indicator by displaying a portion of the input including the first key phrase, the second key phrase and other phrases in the input, and annotating the first key phrase and the second key phrase so that the first key phrase and the second key phrase appear different from the other phrases of the input that are displayed.

In another example embodiment, the processor is configured to output the first key phrase, the second key phrase and the relation indicator by displaying the first key phrase on a display of the output device, displaying the second key phrase on the display, and displaying an elongated member having a first end portion and a second end portion, the first end portion being proximate to the first key phrase and the second end portion being proximate to the second key phrase.

In another example embodiment, the processor is configured to output the relation indicator by displaying a line connecting the first key phrase with the second key phrase.

In another example embodiment, the processor is configured to output the relation indicator by displaying an arrowhead when the relation between the first key phrase and the second key phrase includes a causal relation.

In another example embodiment, the processor is configured to output the relation indicator by displaying a relation string that indicates the relation between the first key phrase and the second key phrase.

In another example embodiment, the processor is configured to output the first key phrase, the second key phrase and the relation indicator by displaying a portion of the input including the first key phrase, the second key phrase and other phrases in the input, displaying the first key phrase in accordance with a first visual parameter, displaying the second key phrase in accordance with a second visual parameter, and displaying the other phrases in the input in accordance with a third visual parameter that is different from the first visual parameter and the second visual parameter.

In another example embodiment, the first, second and third visual parameters comprise corresponding first, second and third typefaces.

In another example embodiment, the processor is configured to output the first key phrase, the second key phrase and the relation indicator by displaying a concept map including the first key phrase and the second key phrase.

In another example embodiment, the processor is configured to output the first key phrase, the second key phrase and the relation indicator by displaying a Venn diagram including the first key phrase and the second key phrase.

In another example embodiment, the processor is configured to output the first key phrase, the second key phrase and the relation indicator by: displaying a map of a location corresponding with the first key phrase; and displaying an object, corresponding with the second key phrase, proximate to the location in the map.

In another example embodiment, the processor is configured to output the first key phrase, the second key phrase and the relation indicator by: displaying a timeline including a time corresponding with the first key phrase; and displaying an event, corresponding with the second key phrase, proximate to the time in the timeline.

In another example embodiment, the processor is configured to output the first key phrase, the second key phrase and the relation indicator by displaying a flow diagram including the first key phrase and the second key phrase when the relation is a causal relation.

In another example embodiment, the processor is configured to output the first key phrase, the second key phrase and the relation indicator by displaying an image corresponding with the first key phrase; and annotating a portion of the image, the portion corresponding with the second key phrase.

In another example embodiment, the processor is further configured to display a testability indicator indicating the testability of the first key phrase in a test or an exam. In another example embodiment, the processor is further configured to receive the testability indicator via the communication device. In another example embodiment, the processor is further configured to display another testability indicator indicating the testability of the second key phrase. In an example embodiment, the testability indicator comprises a probability.

In another example embodiment, the processor is further configured to receive a resource via the communication device; and output the resource via the output device.

A computer-implemented method comprising: receiving an input via a communication device, identifying a first key phrase in the input, identifying a second key phrase in the input, identifying a relation between the first key phrase and the second key phrase, and transmitting the first key phrase, the second key phrase and a relation indicator indicating the relation between the first key phrase and the second key phrase.

In an example embodiment, identifying the first key phrase comprises identifying the first key phrase in response to the first key phrase matching a phrase stored in a data store.

In another example embodiment, identifying the first key phrase comprises identifying the first key phrase in response to a first occurrence of the first key phrase being within a first portion of the input. In an example embodiment, the first portion comprises a beginning portion of the input. In another example embodiment, the first portion of the input includes phrases from the beginning of the input to a first percentage of the input. In another example embodiment, the first percentage includes about one percent to twenty five percent.

In another example embodiment, identifying the first key phrase comprises identifying the first key phrase in response to a last occurrence of the first key phrase being within a second portion of the input. In an example embodiment, the second portion of the input comprises an end portion of the input. In another example embodiment, the second portion of the input includes phrases from a second percentage of the input to the end of the input. In another example embodiment, the second percentage includes about seventy five percent to ninety nine percent.

In another example embodiment, identifying the first key phrase comprises identifying the first key phrase in response to the first key phrase being semantically related to another phrase in the input.

In another example embodiment, identifying the first key phrase comprises: transmitting a request for phrases that are semantically related to the first key phrase, receiving one or more phrases in response to the request, and determining whether the one or more received phrases matches another phrase in the input.

In another example embodiment, identifying the first key phrase comprises identifying the first key phrase based on a length of the first key phrase.

In another example embodiment, identifying the first key phrase comprises identifying the first key phrase based on a number of occurrences of the first key phrase in the input.

In an example embodiment, further comprising identifying a domain corresponding with the input. In an example embodiment, identifying the domain comprises: comparing phrases from the input with phrases from a domain data store; and identifying a domain corresponding with the domain data store as the domain corresponding with the input in response to the phrases from the input matching the phrases from the domain data store.

In an example embodiment, identifying the first key phrase comprises identifying the first key phrase in response to the first key phrase matching a phrase in a domain data store.

In another example embodiment, identifying the second key phrase comprises identifying the second key phrase by selecting a phrase in the input that is a cognitive synonym of the first key phrase.

In another example embodiment, identifying the second key phrase comprises: transmitting the first key phrase, requesting one or more cognitive synonyms of the first key phrase via the communication device, receiving the one or more cognitive synonyms of the first key phrase via the communication device, and determining whether the second key phrase matches the one or more cognitive synonyms.

In another example embodiment, the cognitive synonyms of the first key phrase comprise one or more of a hypernym, a hyponym, a holonym, a meronym, a sister term, a derivationally related phrase and a synonym of the first key phrase.

In another example embodiment, identifying the relation between the first key phrase and the second key phrase comprises: requesting a lexical database for one or more cognitive synonyms of the first key phrase via the communication device, receiving the one or more cognitive synonyms of the first key phrase from the lexical database via the communication device, and determining whether the second key phrase matches at least one of the cognitive synonyms of the first key phrase.

In another example embodiment, identifying the relation comprises identifying the relation as a hyponymous relation in response to the second key phrase matching a hyponym of the first key phrase.

In another example embodiment, identifying the relation comprises identifying the relation as a meronymy relation in response to the second key phrase matching a meronym of the first key phrase.

In another example embodiment, identifying the relation comprises identifying the relation as a holonymy relation in response to the second key phrase matching a holonym of the first key phrase.

In another example embodiment, identifying the relation comprises identifying the relation as an antonymy relation in response to the second key phrase matching an antonym of the first key phrase.

In another example embodiment, identifying the relation comprises identifying the relation as a homonymy relation in response to the second key phrase matching a homonym of the first key phrase.

In another example embodiment, identifying the relation comprises identifying the relation as a hypernymous relation in response to the second key phrase matching a hypernym of the first key phrase.

In another example embodiment, identifying the relation comprises identifying the relation as a synonymy relation in response to the second key phrase matching a synonym of the first key phrase.

In another example embodiment, identifying the relation comprises identifying the relation as a locative relation in response to the first key phrase matching a location and the second key phrase matching an entity in or adjacent to the location.

In another example embodiment, identifying the relation comprises identifying the relation as a temporal relation in response to the first key phrase matching a time or a time period and the second key phrase matching an event that occurred within the time period or proximate to the time period or the time.

In another example embodiment, identifying the relation comprises identifying the relation as a causal relation in response to the first key phrase matching a trigger condition and the second key phrase matching a result condition resulting from the trigger condition.

In another example embodiment, identifying the relation comprises identifying the relation as an instance-of relation in response to the second key phrase matching an entity that is an instance of an entity associated with the first key phrase.

In another example embodiment, the relation indicator comprises a relation string; and wherein the method further comprises computing the relation string that indicates the relation between the first key phrase and the second key phrase.

In another example embodiment, the method further comprising selecting the relation string from a plurality of relation strings, wherein the selected string corresponds with the relation between the first key phrase and the second key phrase.

In another example embodiment, selecting the relation string comprises: for each relation string, computing a corresponding concatenated relation string by concatenating the first key phrase, the relation string and the second key phrase, computing a fluency value for each concatenated relation string, identifying the concatenated relation string with the highest fluency value, and selecting the relation string corresponding with the concatenated relation string having the highest fluency value.

In another example embodiment, transmitting the relation indicator comprises transmitting one or more of: a concept map; a Venn diagram; a map with an object overlapping the map, the map corresponding with the first key phrase and the object overlapping the map corresponding with the second key phrase; a timeline in response to the relation including a temporal relation; a flow diagram including at least one arrowhead in response to the relation including a causal relation; and an image, the image corresponding with the first key phrase, and a portion of the image corresponding with the second key phrase.

In another example embodiment, the method further comprising: determining whether the first key phrase matches a phrase in an exam data store, and transmitting a first testability indicator in response to the first key phrase matching a phrase in the exam data store.

In another example embodiment, the method further comprising: determining whether the second key phrase matches a phrase in the exam data store, and transmitting a second testability indicator in response to the second key phrase matching a phrase in the exam data store.

In another example embodiment, the exam data store comprises a plurality of phrases, each phrase having an associated number of occurrences of the phrase in exams.

In another example embodiment, the exam data store comprises a plurality of phrases, each phrase having an associated percentage of exams in which the phrase appears.

In another example embodiment, transmitting the first testability indicator comprises transmitting a percentage of exams in which the first key phrase appears.

In an example embodiment, the method further comprising: retrieving a resource; and transmitting the resource via the communication device. In an example embodiment, retrieving the resource comprises querying a resource data store. In another example embodiment, retrieving the resource comprises querying a resource data store using a concatenation of the first key phrase, a relation string, and the second key phrase.

In another example embodiment, retrieving comprises selecting the relation string from a plurality of relation strings by selecting the relation string that corresponds with the relation between the first key phrase and the second key phrase.

In another example embodiment, transmitting the resource comprises transmitting text including both the first key phrase and the second key phrase.

In another example embodiment, transmitting the resource comprises transmitting text including both the first key phrase and the second key phrase in a single sentence or a single paragraph.

In another example embodiment, transmitting the resource comprises transmitting one or more of a video, a link to a video, an image, a link to an image, an audio resource, a link to an audio resource, a web resource, a link to a web resource, a journal resource and a link to a journal resource.

In another example embodiment, receiving the input comprises receiving text including a first sentence and a second sentence, the first sentence including the first key phrase and the second sentence including the second key phrase.

In another example embodiment, the input comprises a first portion having no syntactical limitations and a second portion having syntactical limitations.

In an example embodiment, identifying the first key phrase comprises identifying the first key phrase from the first portion of the input having no syntactical limitations; and wherein identifying the second key phrase comprises identifying the second key phrase from the second portion of the input having syntactical limitations.

In another example embodiment, receiving the input comprises receiving one or more of a file, a link to a file, an electronic textbook, a link to an electronic textbook, an audio input, an audio book, a video input, a video lecture, and an image input.

In another example embodiment, receiving the input comprises receiving an audio input, the method further comprising converting speech in the audio input to text using a speech-to-text algorithm.

In another example embodiment, receiving the input comprises receiving an image input, the method further comprising identifying characters in the image input via optical character recognition.

In another example embodiment, receiving the input comprises receiving a video input having an audio input portion and an image input portion, the method further comprising converting speech in the audio input portion to text and identifying characters in the image input portion via optical character recognition.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

FIG. 1 shows an apparatus 101. The apparatus 101 includes a processor 103. The processor 103 is connected with an output device 105, an input device 107, a communication device 109 and a memory 111.

The apparatus 101 can include a personal computer, a desktop computer, a laptop, an electronic mobile communication device, a tablet device, a smart phone, a server or the like.

The processor 103 can include a general purpose processor, or the processor 103 can include a processor intended for specific tasks, such as an Application Specific Integrated Circuit (ASIC). The processor 103 can be configured to execute instructions stored in the memory 111.

The output device 105 can include a display, a touchscreen display, a speaker, a tactile sensor, or the like.

The input device 107 can include a touchscreen display, a keyboard, a mouse, a touchpad, a trackpad, a microphone, an image sensor, a camera, or the like.

The communication device 109 can include a wireless communication interface or a wired communication interface. The communication device 109 can include a transceiver. The transceiver can include a wireless transceiver, such as a cellular transceiver, a wireless local area network (WLAN) transceiver, a Bluetooth™ transceiver, a Near Field Communications (NFC) transceiver, or the like. The communication device 109 can also include a wired communication interface, such as Ethernet, Universal Serial Bus (USB), Firewire, or the like.

The apparatus 101 can communicate with other devices, servers or networks via the communication device 109. For example, the apparatus 101 can access internet websites via the communication device 109. The apparatus 101 can also access electronic application stores through the communication device 109. The apparatus 101 can download software applications from the internet or an electronic application store, install the software applications and execute the software applications when requested.

Figure 2:
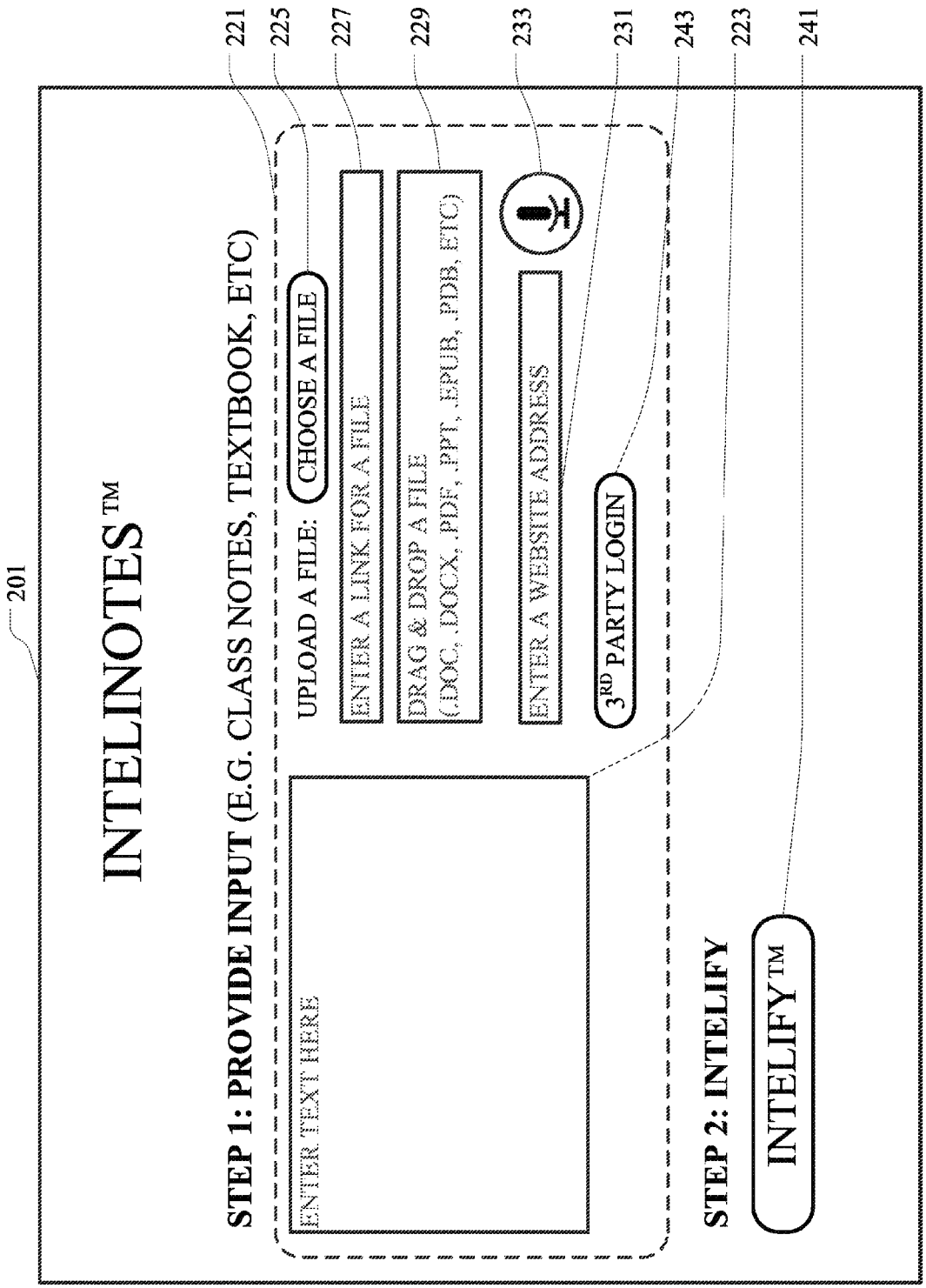
FIG. 2 is a diagram illustrating an example user interface.

FIG. 2 shows an example user interface that can be presented by the apparatus 101 through the output device 105. FIG. 2 shows a user interface 201 having an input receiving portion 221, and an input submit element 241.

The input receiving portion 221 can include a text box 223 that can receive input in the form of plain text, for example. The input receiving portion 221 can include a file upload button 225 that can receive input in the form of a file. Through the file upload button 225, a file stored in the memory 111 can be received, for example.

The input receiving portion 221 can include a file link field 227. The file link field 227 can be used to receive a link to a file. The link can include a link to a location in the memory 111 of the apparatus 101. The link to the file can include a link to a file on a database remote from the apparatus 101, for example a link to a file stored on a web server. The link to the file can include a link to a file accessible through another application on the apparatus 101. For example, the link can include a link to an electronic textbook purchased through an application that allows purchasing of electronic textbooks from an electronic textbook store.

The input receiving portion 221 can also include a file drag-drop element 229 that can receive a file when a file is dragged and dropped into the file drag-drop element 229.

The file upload button 225, the file link field 227 and the file drag-drop element 229 can receive files in many different formats, such as word documents in .doc and .docx, documents in the Portable Document Format (PDF), image files in .jpeg, audio files in .wav, .mp3, video files in .mpeg, files in .epub, or the like. If a received file includes non-machine-readable text, then text can be identified in the file using Optical Character Recognition (OCR) techniques.

The input receiving portion 221 can also include a website address field 231 that can receive website addresses such as addresses from Wikipedia. When a website address is received via the website address field 231, the input includes the content of the website.

The input receiving portion 221 can also include an audio receiving element 233 for receiving audio as an input. When the audio receiving element 233 is pressed or activated then a microphone of the output device 105 is activated and the microphone receives audio as the input. The received audio can be converted into text with machine-recognizable words or phrases using standard speech-to-text techniques.

The input receiving portion 221 can include a third party login plugin 243 that can be used by a user to login using the user's Facebook account, Google™ account, user's learning management system account (e.g. Desire2Learn™, BlackBoard™), iTunes account, Amazon Kindle account, Linkedin™ account, or Twitter™ account. Upon logging in through the $3^{rd}$ party account, inputs from the $3^{rd}$ party account can be retrieved. For example, an ebook from the user's Amazon Kindle account can be retrieved once the user has logged in using the user's Amazon Kindle account. In another example, a powerpoint presentation from the user's learning management system account can be retrieved once the user has logged in using the user's learning management system account.

The input submit element 241 can be selected to submit the input for processing. The input submit element 241 can include a button, for example.

The input can include an electronic textbook or a selected portion of an electronic textbook, for example, a chapter from an electronic textbook. The electronic textbook can include an electronic textbook that was purchased or rented from an electronic textbook store (e.g. Googlebooks, iBooks, Amazon, Chegg), an electronic application store (e.g. App store, Google Play Store) or an internet website. The input receiving portion 221 can also receive login credentials for a website or an electronic textbook store, and use the login credentials to access the website or the electronic textbook store where the electronic textbook is stored.

The input can include a course book, textbook notes, class notes, lecture notes, study notes, or any other input with machine-recognizable words or phrases. The input can also include audio. The audio can be converted into text using speech-to-text algorithms.

The length and structure of the input can vary to a great extent. For example, if the input includes an electronic textbook, then the input can include hundreds of pages with thousands of sentences that are written with proper grammatical structure. If the input includes class notes or lecture notes typed hastily by a student during a class or a lecture, then the input can include one or more pages with words or phrases that are not structured as proper grammatical sentences but rather as text in the form of bullet points or point-form notes. In some embodiments, the input can include two or more phrases with no syntactical limitations. In other words, the sequence of phrases in the input does not have to follow proper syntax (i.e. the sequence of phrases can purposefully defy the rules of grammar).

Figure 3:
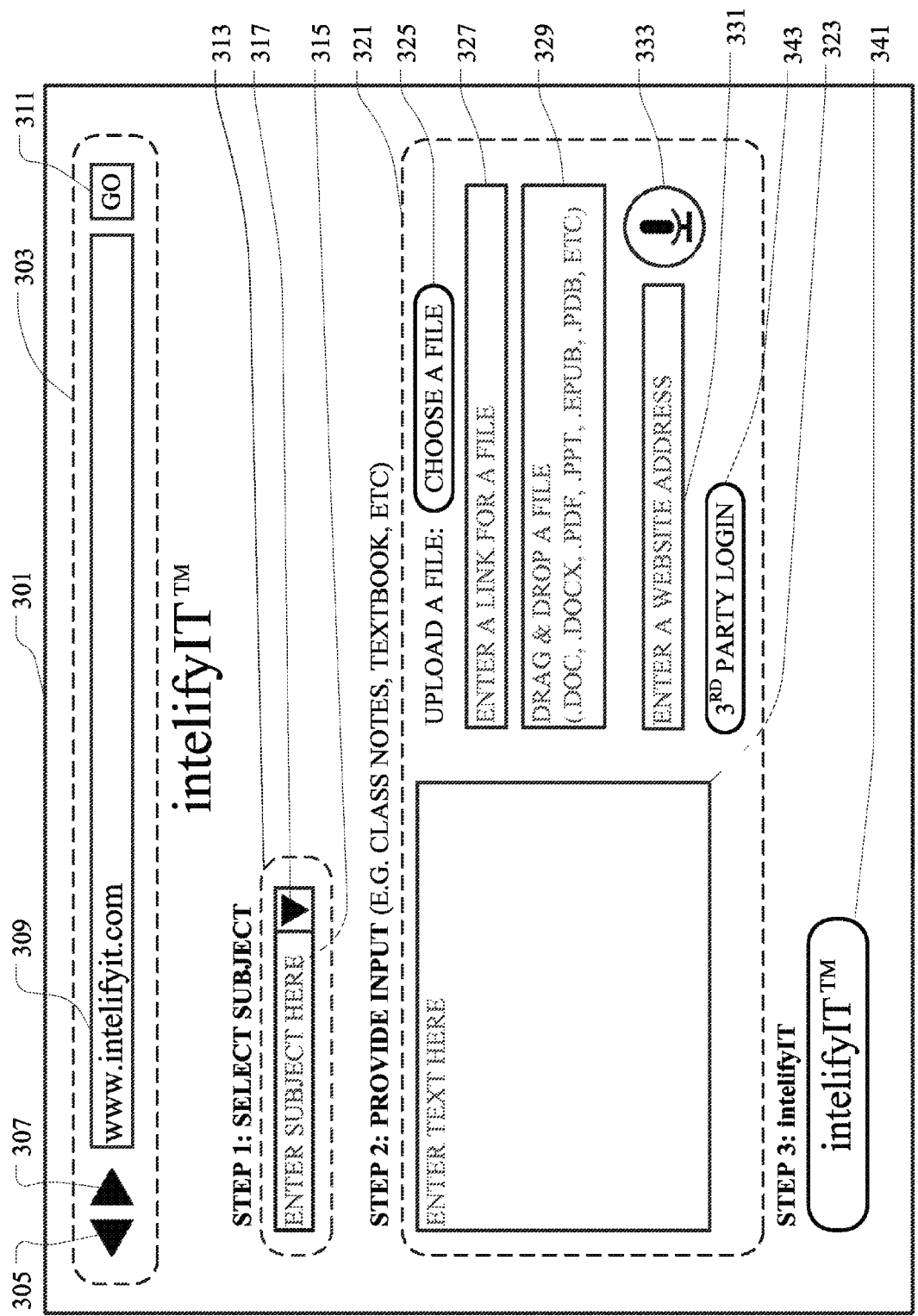
FIG. 3 is a diagram illustrating another example user interface.

FIG. 3 shows another example user interface that can be presented by the apparatus 101 through the output device 105. FIG. 3 shows a user interface 301. The user interface 301 is a web-based user interface. The user interface 301 includes a navigation bar 303, a domain input portion 313, an input receiving portion 321, and an input submit element 341.

The navigation bar 303 includes a back button 305, a forward button 307, a website address bar 309 and a submit button 311.

The domain input portion 313 includes a domain input field 315 where a domain can be typed. The domain input portion 313 also includes a drop down box 317 through which a domain can be selected from a given number of domains.

The input receiving portion 321 is similar to the input receiving portion 221 and the input submit element 341 is similar to the input submit element 241.

A domain includes a subject area or a topic that relates to the input received through the input receiving portion 321. Examples of domains include Economics, Biology, Physics, Mathematics, English, Chemistry, etc. As an example, if the input being submitted includes lecture notes from an economics class, then the domain can be selected to be Economics. If a domain does not appear in the drop down box 317, then the domain can be typed in the domain input field. Advantageously, new domains can be added.

Although FIG. 3 shows that a domain of an input can be specified by a user through the user interface 301, the domain of the input can also be determined automatically without the user having to specify the domain. A method for automatically determining the domain of an input will be explained later in the description.

Figure 4:
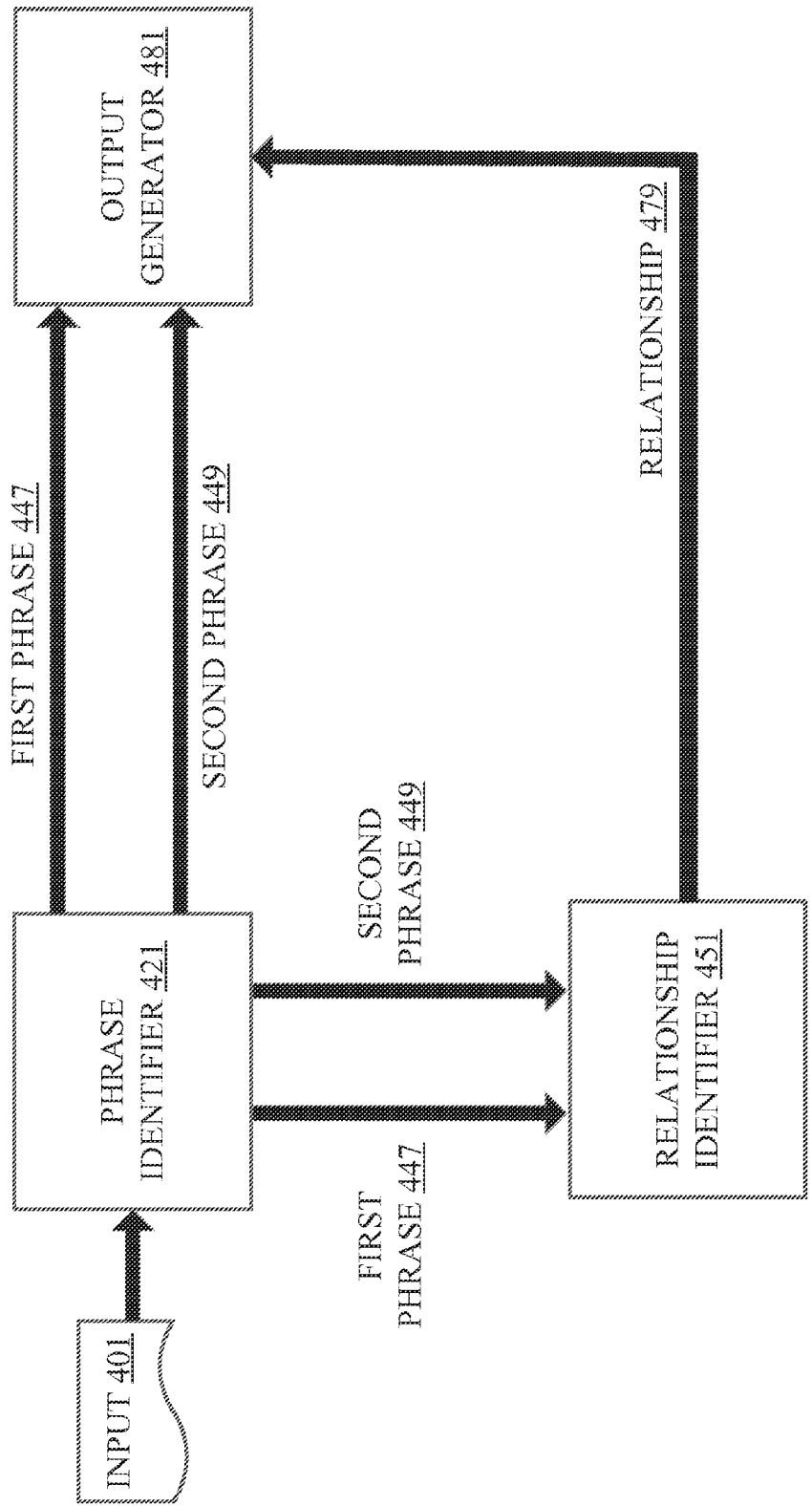
FIG. 4 is a flow diagram illustrating an example method for processing an input.

After an input is received, the input is processed. FIG. 4 shows an example method for processing the input after the input is received via the user interface 201 or the user interface 301, for example.

FIG. 4 shows an input 401 that is received via the user interface 201 or the user interface 301, for example. The input 401 is sent to a phrase identifier 421 that identifies a first phrase 447 and a second phrase 449 in the input 401. The first phrase 447 and the second phrase 449 are sent for further processing to a relationship identifier 451 and an output generator 481. The relationship identifier 451 identifies a relationship 479, if any, between the first phrase 447 and the second phrase 449 and sends the relationship 479 to the output generator 481. The output generator 481 outputs the first phrase 447, the second phrase 449 and the relationship 479 between the first phrase 447 and the second phrase 449. The phrase identifier 421, the relationship identifier 451 and the output generator 481 will now be described in more detail.

In an example embodiment, the phrase identifier 421 is a software module stored in the memory 111. In another example embodiment, the phrase identifier 421 is a software application that resides on a server and is accessible to the apparatus 101 over a public network. The phrase identifier 421 identifies the first phrase 447 and the second phrase 449 as key phrases in the input 401. Although FIG. 4 only shows the phrase identifier 421 as identifying two phrases in the input 401 as key phrases. The phrase identifier 421 can be configured to identify more than two phrases. For example, the phrase identifier 421 can be configured to identify 3 phrases, 5 phrases, or any other number of phrases in the input 401. The phrase identifier 421 can also be configured to identify a number of phrases as a percentage of the total number of phrases in the input 401. For example, the phrase identifier 421 can be configured to identify 10%, 25% or any other percentage of the total number of phrases in the input 401. For example, if the input 401 contains 50 phrases and the phrase identifier 421 is configured to identify 10% of the phrases in the input 401, then the phrase identifier 421 identifies 5 phrases that the phrase identifier 421 determines to be key phrases.

Changes to the configuration of the phrase identifier 421 can be made by a user via the user interface 201 or the user interface 301, for example. Changes to the configuration of the phrase identifier 421 can also be made by an administrator through an administrator control panel, for example.

Figure 5:
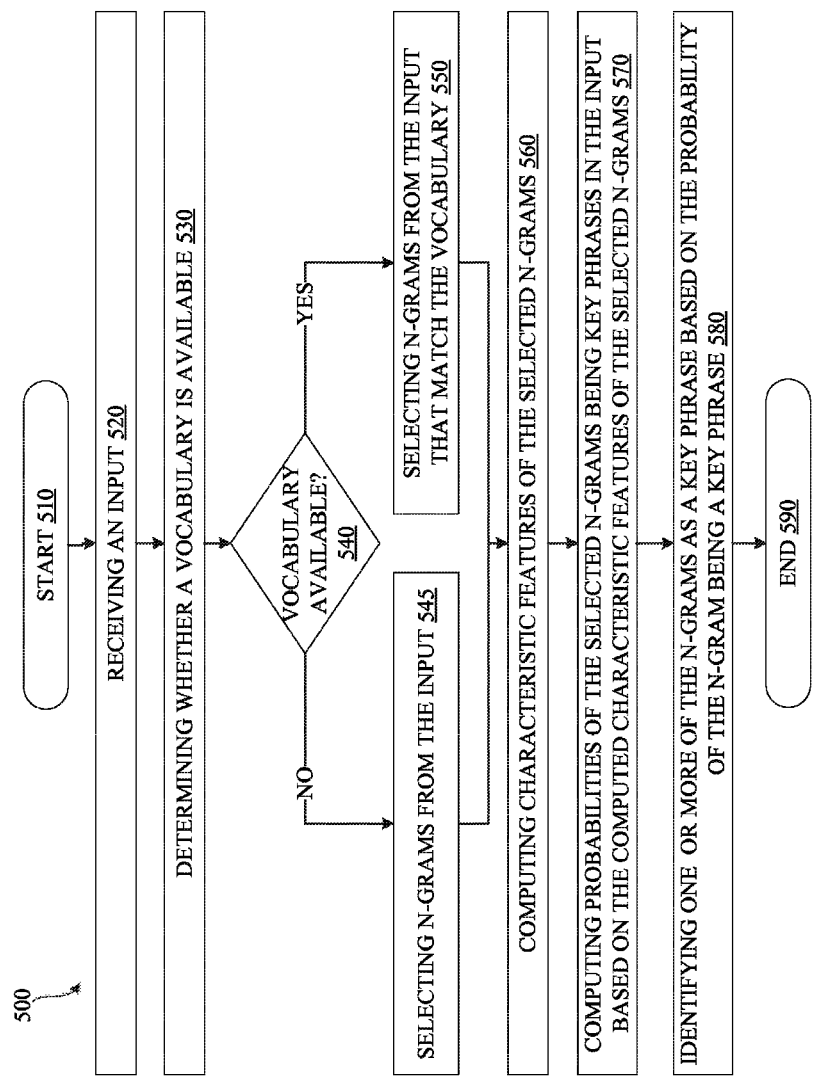
FIG. 5 is a flow diagram illustrating an example method for identifying key phrases in the input.

FIG. 5 shows an example method for identifying key phrases in an input. The method 500 starts at step 510.

At 520, an input is received. For example, the input 401 is received by the phrase identifier 421. As discussed earlier, the input can include grammatically-correct sentences, grammatically-incorrect sentences, or a combination of grammatically-correct and grammatically-incorrect sentences.

At 530, it is determined whether a vocabulary is available. The vocabulary can include a dictionary or a thesaurus. The vocabulary can also include a domain-specific vocabulary. For example, if the input relates to Chemistry or Physics, then the vocabulary can include The Chemical Rubber Company (CRC) Handbook of Chemistry and Physics. The vocabulary can include all the terms in the Handbook or a portion of the terms from the Handbook. In some embodiments, the vocabulary can include images. The images can be retrieved from an online database, such as dbpedia or Wikipedia. In some embodiments, the vocabulary can include glossary terms from a textbook, for example glossary terms from a textbook that the student user is using to study for a course. In some embodiments, the vocabulary can include terms from a table of contents of a textbook. In yet other embodiments, the vocabulary can include key phrases from tests of exams that were administered in the past. As will be discussed later, the tests and exams can be from the user's school/university, or from other schools/universities with a similar course to what the user is studying for. Advantageously, by selectively including terms in the vocabulary the phrase identifier 421 can identify phrases that are more likely to be important for the user's specific purpose. For example, if the user is preparing for an economics exam at the University of Waterloo, then by including phrases from previous economics exams administered at the University of Waterloo, the phrase identifier 421 can identify phrases that are more likely to be tested.

A particular vocabulary can be selected from several vocabularies that may be available. The selection of the particular vocabulary can be based on a value of a domain indicated via the domain input portion 313, for example. For example, if the domain input field 315 indicates "Economics", then the vocabulary can include all or some terms from The New Palgrave Dictionary of Economics.

A domain-specific vocabulary can also include terms from a glossary of a textbook. For example, if the input includes an electronic textbook on Microeconomics, then the vocabulary can include terms from a glossary of the textbook on Microeconomics. If the glossary terms of that textbook are not available then the vocabulary can include the glossary terms from another similar textbook, for example a textbook on the same subject but from a different author or an older edition of the textbook.

In another example, if the input includes class notes or lecture notes for a particular subject then the vocabulary can include glossary terms from a textbook that is used to teach that subject. For example, a user can indicate via the user interface 301 that the user is studying Physics at the University of Waterloo and that the user's professor is using *Fundamentals of Physics* written by Halliday, Resnick, and Walker to teach the course. In this example, the vocabulary can include glossary terms from that textbook or another similar textbook. The vocabulary can include terms from the table of contents of the textbook. The vocabulary can include terms from a course syllabus or course outline. The vocabulary can include terms from previous exams. In an example embodiment, the vocabulary is stored in a data store. In another example embodiment, different domain-specific vocabularies are stored in respective domain data stores.

As discussed earlier, a domain can be specified through the user interface 301. A domain can also be determined automatically without the user having to specify the domain. The domain of the input can be determined by analyzing the input. For example, by examining a title of the input. The domain can also be determined by determining the number of phrases in the input that appear in different domain-specific vocabularies. For example, if twenty phrases from the input appear in an economics-centric vocabulary, three phrases from the input appear in a chemistry-centric vocabulary and no phrases from the input appear in an engineering-centric vocabulary, then Economics is identified as the domain and the economics-centric vocabulary will be used for further processing of the input by the phrase identifier 421.

At 540, if a vocabulary is not available, then the method 500 proceeds to 545, else the method 500 proceeds to 550.

At 545, n-grams are selected from the input. An n-gram is a contiguous sequence of n items in the input. An n-gram of size one is referred to as a unigram, an n-gram of size two is referred to as a bi-gram, an n-gram of size three is referred to as a tri-gram, and an n-gram of size four is referred to as a four-gram, etc.

The phrase identifier 421 can be configured to select n-grams that are of a particular size. For example, the phrase identifier 421 can be configured to select unigrams, bi-grams and tri-grams. The phrase identifier 421 can be configured to select n-grams that do not start or end with a stopword. Stopwords are words that are filtered out prior to further processing because their presence may skew the results of further processing. Examples of stopwords are "the", "is", "are", etc. The list of stopwords can be modified to include additional stopwords or to remove certain words from the list.

The phrase identifier 421 can be configured to perform stemming of the selected n-grams. Stemming is the process of reducing words to their stem, base or root form. The stem does not have to be identical to the morphological root of the word. It is usually sufficient that related words map to the same step. For example, stemming can reduce "cats", "catlike" and "catty" to their root word "cat".

At 550, the phrase identifier 421 ensures that the selected n-grams match terms in the vocabulary. If a selected n-gram does not match any term in the vocabulary, the selected n-gram is unselected and is not subjected to further processing.

At 560, characteristic feature values are computed for each of the selected n-grams.

A characteristic feature value that can be computed for some of the selected n-grams is a first occurrence value. The first occurrence is computed as a percentage of the phrases preceding the first occurrence of the selected n-gram. N-grams with a lower first occurrence value are more likely to be key phrases because phrases that appear towards the start of an input document are more likely to be key phrases, for example the first 25% of the document. Similarly, a last occurrence value can also be computed for each of the selected n-grams. The last occurrence is computed as a percentage of the phrases succeeding the last occurrence of the selected n-gram. N-grams with a lower last occurrence value are more likely to be key phrases because phrases that appear towards the end of an input document are more likely to be key phrases, for example the last 25% of the document. N-grams with a lower first occurrence value and a lower last occurrence value are likely to be key phrases because they occur towards the beginning and the end of the input document.

Another characteristic feature value that can be computed for some of the selected n-grams is a length of the n-gram. Bi-grams can be given more weight than unigrams and tri-grams, if key phrases tend to be bi-grams in a particular domain.

Yet another characteristic feature value that can be computed for some of the selected n-grams is a node degree of the n-gram. The node degree of a selected n-gram is the number of other selected n-grams that are semantically related to the n-gram. The node degree can be computed using a thesaurus or an online database, such as Wordnet. In some embodiments, the node degree can be computed using a database stored in the memory 111 of the apparatus 101. The database can include glossary terms from a textbook. The database can include a subset of terms from an online database, such as Wordnet.

A further characteristic feature value that can be computed for some of the selected n-grams is a measure describing the specificity of the n-gram in the input document compared to other similar documents, for example other documents in the same domain. For example, if a candidate phrase appears in several of the other documents in the same domain, then the candidate phrase is more likely to be a key phrase in the present input document. In another example, if a candidate phrase is a key phrase in several of the other documents in the same domain, then the candidate phrase is more likely to be a key phrase in the present input document.

Another characteristic feature value that can be computed for some of the selected n-grams is whether the selected n-gram appears in a previous test or exam. In some embodiments, if the selected n-gram appears frequently in previous tests or exams then the selected n-gram can be selected as a key phrase regardless of the values of other characteristic features of the selected n-gram. Advantageously, concepts that have previously been tested can be identified by the phrase identifier 421 and brought to the user's attention, so that the user is made aware of their increased likelihood of being tested on a future test or exam. As discussed earlier in relation to the vocabulary, the tests or exams can be from the user's school/university or from other schools/universities.

In an example embodiment, another characteristic feature value includes a number of occurrences of the phrase in the input.

In an example embodiment, another characteristic feature value includes an amount of time that a user spent viewing a phrase on a display. While the input is being displayed on a display, a front-facing camera tracks the movement of the eyes of the user viewing the display. If the user spends more time looking at a particular phrase, then that phrase is more likely to be a key phrase. In an example embodiment, a phrase is identified as a key phrase when the user views the phrase for an amount of time that exceeds a threshold time. In another example embodiment, if the user goes back to read a phrase, then that phrase is more likely to be a key phrase. This characteristic feature is user-dependent and the value of this characteristic feature is expected to be different for different users because not everyone will spend the same amount of time looking at a particular phrase or go back to re-read a particular phrase. Advantageously, by using this user-dependent characteristic feature, the phrase identifier 421 can identify key phrases that the user viewing the input may consider to be key phrases.

At 570, the probability of each n-gram being a key phrase is computed. The probability is computed based on the characteristic feature values associated with the n-gram. In an example embodiment, a lookup table is used to determine the probability based on the characteristic feature values.

In another example embodiment, a set of rules is used to determine the probability of an n-gram being a key phrase. For example, a rule can assign a selected n-gram a probability of 0.9 if the n-gram has a first occurrence of 0.10 or less meaning the n-gram first appears within the first 10% of the input document, a last occurrence of 0.10 or less meaning the n-gram last appears within the last 10% of the input document, a length of two meaning the n-gram includes two words, and a node degree of one or more meaning the n-gram is semantically related to at least one other selected n-gram.

This rule and other such rules can be created manually or they can be determined automatically. Table 1 shows examples of rules for determining the probability of a selected n-gram being a key phrase.

TABLE 1

Rules for determining the probability of an n-gram being a key phrase

| First Occurrence | Last Occurrence | Length | Node degree | Probability |
|---|---|---|---|---|
| <0.10 | <0.10 | 2 | 1 or more | 0.9 |
| <0.25 | <0.25 | 1 or 2 | 0 or more | 0.7 |
| <0.40 | <0.40 | 1 or 2 | 0 or more | 0.4 |

In an example embodiment, the rules for determining the probability of an n-gram being a key phrase can be determined automatically. In order to generate a set of rules, the phrase identifier 421 can be calibrated. During calibration, the phrase identifier 421 receives one or more input documents in a domain and the phrase identifier 421 also receives key phrases for each input document. A person may have selected the key phrases manually. The phrase identifier 421 computes characteristic feature values for each of the key phrases that are provided and uses the computed characteristic feature values in identifying phrases for future documents. For example, if 90% of the provided key phrases have a first occurrence of less than 0.10, a last occurrence of less than 0.10, have a length of two words and a node degree of 1, then the phrase identifier 421 can assign a probability of 0.9 to a selected n-gram with these characteristic features in an input document.

In an example embodiment, a user can provide a calibration document and its corresponding key phrases for calibrating the phrase identifier 421 via the user interface 201 or the user interface 301.

In an example embodiment, the phrase identifier 421 employs domain-specific phrase identification models. For example, when the domain of the input 401 is determined to be Economics then the phrase identifier 421 employs the Economics-specific phrase identification model to identify phrases in the input 401. The Economics-specific phrase identification model can be different from, for example, a biology-specific phrase model. For example, when using the biology-specific phrase identification model the phrase identifier 421 can assign a different probability to phrases with the same characteristic feature values, as can be seen in Table 2.

TABLE 2

Probabilities for two domain-specific phrase identification models

| | | | | Probability | |
|---|---|---|---|---|---|
| 1$^{st}$ Occur. | Last Occur. | Length | Node degree | Economics | Biology |
| <0.10 | <0.10 | 2 | 1 or more | 0.9 | 0.75 |
| <0.25 | <0.25 | 1 or 2 | 0 or more | 0.7 | 0.55 |
| <0.40 | <0.40 | 1 or 2 | 0 or more | 0.4 | 0.25 |

Although the description above discusses using the first occurrence, the last occurrence, the length, the node degree and the measure of the specificity as characteristic features, other characteristic features can also be used. For example, another characteristic feature can be whether the selected n-gram appears in another document, such as a test or an exam related to the input document's domain. In some embodiments, only some of the characteristic features may be used, instead of all of them. For example, in some embodiments, only first occurrence and last occurrence may be used in computing the probability. Further, in some embodiments, if a selected n-gram's characteristic feature matches a threshold then the selected n-gram can be selected as a key phrase regardless of the probability of the n-gram being a key phrase. For example, if the first occurrence of a selected n-gram is 0 then the n-gram can be selected as a key phrase, perhaps, because the n-gram is a title of the input document.

At 580, the phrase identifier 421 identifies one or more of the selected n-grams as key phrases. The phrase identifier 421 identifies some of the selected n-grams as key phrases based on the probabilities of the n-grams being key phrases. For example, the phrase identifier 421 can identify the n-gram with the highest probability of being a key phrase as the key phrase. In another example, the phrase identifier 421 can identify two n-grams with the highest probabilities of being key phrases as key phrases, for example as the first phrase 447 and the second phrase 449.

At 590, the method 500 concludes.

In some embodiments, after identifying key phrases in the input 401 using the method 500, the phrase identifier 421 identifies additional key phrases in the input 401 by selecting phrases in the input 401 that are semantically related to the key phrases identified during the method 500. Advantageously, additional key phrases can be identified even though the characteristic feature values of the additional key phrases may have rendered the additional key phrases as improbable key phrases.

In some embodiments, instead of, or in addition to, using the method 500 to identify key phrases, the phrase identifier 421 selects the first phrase 447 to be a domain related to the input 401, a title of the input 401, or the first phrase that appears in the input 401. The phrase identifier 421 then identifies the second phrase 449 by selecting a phrase in the input 401 that is semantically related to the first phrase 447.

An advantage of using the method 500, or the alternative methods discussed above, to identify key phrases in the input 401 is that the input 401 can include two or more phrases with no syntactical limitations. In other words, the sequence of phrases in the input does not have to follow proper syntax (i.e. the sequence of phrases can purposefully defy the rules of grammar).

In some embodiments, other techniques including Natural Language Processing (NLP) can be used to identify key phrases in the input 401. However, most of the NLP techniques for identifying phrases appear to rely on the structure of the sentence in the input, as such most NLP algorithms may need sentences with proper syntax in order to produce good results. If the input contains sentences with improper syntax, then most standard NLP techniques may be unable to identify some of the key phrases in the input. Since some inputs, such as class notes or lecture notes that are hastily typed by a student during a class or a lecture, primarily contain sentence fragments, bullet points or point form notes that do not follow proper syntax, NLP techniques that rely on syntax to identify key phrases may fail to identify some of the key phrases in the input.

Advantageously, the method 500 or its alternatives discussed above can identify key phrases in input documents that may primarily include sentence fragments, bullet points or point form notes that lack or do not conform to proper syntax or some rules of grammar.

In some embodiments, additional key phrases can be received through a user interface. For example, the user can provide additional key phrases that the phrase identifier 421 may not have identified. The additional key phrases provided by the user can be used to further calibrate the phrase identifier 421. In an example embodiment, the user can specify the additional key phrases by selecting them with a pointer, highlighting them, or by looking at them for a relatively longer period of time.

Figure 6:
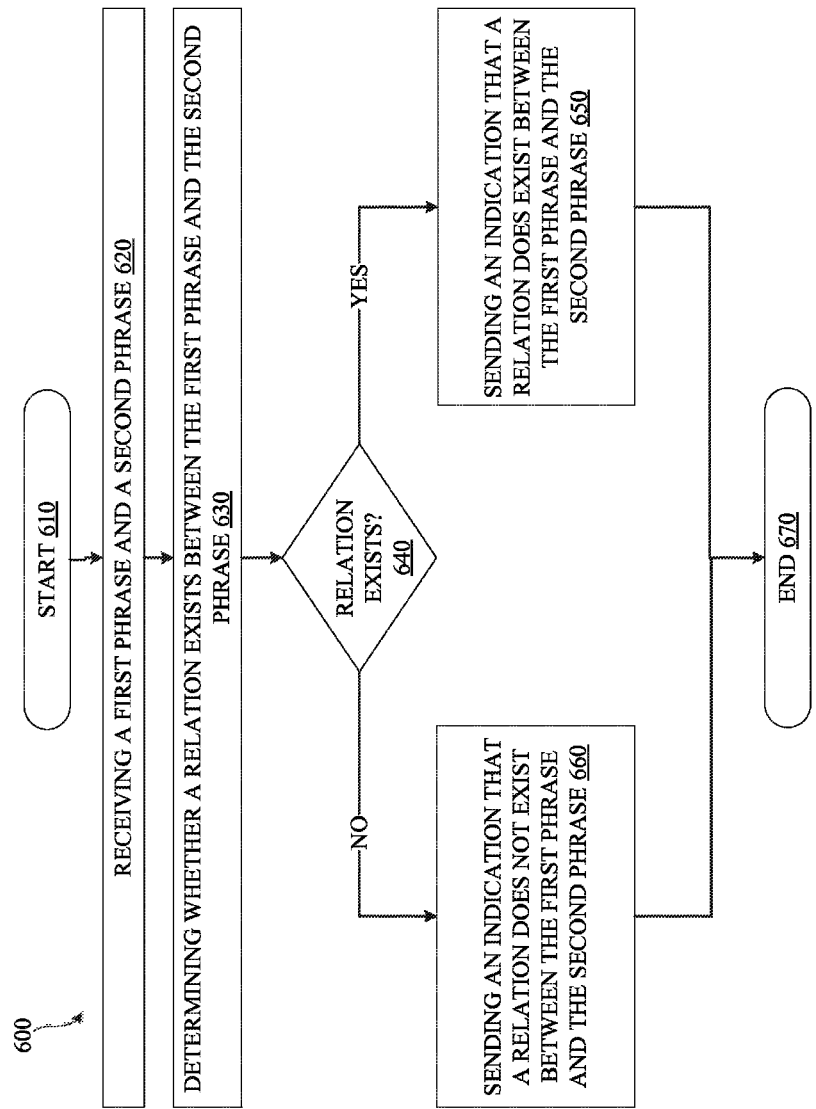
FIG. 6 is a flow diagram illustrating an example method for identifying a relation between the key phrases in the input.

FIG. 6 shows a method 600 that can be used to determine whether a relationship exists between key phrases and to identify the type of the relationship if the relationship exists. For example, the method 600 can be used by the relationship identifier 451 to identify the relationship 479 between the first phrase 447 and the second phrase 449.

The method 600 starts at 610.

At 620, a first phrase and a second phrase are received. For example, the relationship identifier 451 can receive the first phrase 447 and the second phrase 449 from the phrase identifier 421. More than two phrases can be received as well.

At 630, it is determined whether a relationship exists between the first phrase and the second phrase.

In some embodiments, it is determined whether a semantic relationship exists between the first phrase and the second phrase. A semantic relationship can include a relationship between the underlying concepts or meanings of two phrases. The first phrase can be semantically related to the second phrase when the underlying concept or meaning of the first phrase is related to the underlying concept or meaning of the second phrase. There can be many different types of semantic relationships.

An example of a semantic relationship is an active relation in which one phrase expresses the performance of an operation or process affecting the other phrase. For example, "reading" expresses the performance of an operation or process affecting "book", therefore there is an active relation between "reading" and "book". By contrast, another example of a semantic relationship is a passive relation in which one concept is affected by another concept. In some embodiments, active relations between two key phrases can be identified using Wikipedia, dBpedia, or other databases that store linked data. For example, the relationship identifier 451 can query dBpedia to determine whether an active relation exists between the first key phrase and the second key phrase, and if an active relation does exist between the first key phrase and the second key phrase then the relationship identifier 451 can receive an indication of the active relation from dBpedia. Data from external databases, such as Wikipedia, dbpedia, Wordnet, etc, can be periodically imported into the memory 111 so that instead of accessing the external databases over a network the information can be retrieved from the memory 111.

Another example of a semantic relationship is antonymy in which one phrase has the opposite meaning as the other phrase. For example, "cold" is an antonym of "warm" because "cold" and "warm" have opposite meanings, therefore "cold" and "warm" are semantically related. To determine whether there is antonymy between the first phrase and the second phrase, antonyms for the first phrase can be retrieved and it can be determined whether the second phrase matches any of the retrieved antonyms. If the second phrase matches any one of the retrieved antonyms then there is an antonymy relation between the first phrase and the second phrase. In some embodiments, the relationship identifier 451 retrieves antonyms for the first phrase from a thesaurus, from Wordnet, from WolframAlpha or any other electronic online database that stores antonyms for words.

Another example of a semantic relationship is a causal relation in which one phrase represents the cause of the other phrase. For example, there is a causal relation between "Scurvy" and "lack of Vitamin C" because "Scurvy" is caused by the "lack of Vitamin C". In some embodiments, causal relations can be identified by identifying phrases such as "resulting from", "caused by" and "is the cause of". Such phrases can appear between the first phrase and the second phrase and are usually in the same sentence as the first phrase and the second phrase. In some embodiments, the relationship identifier 451 identifies causal relationship by accessing an electronic database, such as Wikipedia, dBpedia, or the like. For example, the relationship identifier 451 can query dBpedia for "Scurvy" and receive "lack of Vitamin C" as a cause for Scurvy from dBpedia.

Another example of a semantic relationship is homonymy in which two different concepts are expressed by the same phrase or symbol. For example, "bank" can be used to represent a financial institution, such as Bank of America, and an edge of a river. In some embodiments, homonyms for the first phrase can be retrieved and it can be determined whether the second phrase matches any of the retrieved homonyms. If the second phrase matches any one of the retrieved homonyms then there is a homonymy relation between the first phrase and the second phrase. In some embodiments, the relationship identifier 451 retrieves homonyms for the first phrase from Wordnet, from WolframAlpha or from any other electronic online database that stores homonyms for words.

Another example of a semantic relationship is a hyponymous relationship which is a relationship between a hyponym and a hypernym. This can also be referred to as a genus-species relation or a hierarchical relation. For example, "car" and "vehicle" are semantically related because "car" is a type of a "vehicle". In a hierarchical relation between "car" and "vehicle", "vehicle" has a higher hierarchy than "car" because "car" is a subordinate of "vehicle". In another example, "chicken" and "bird" are semantically related because "chicken", the narrower term, is a hyponym and "bird", the broader term, is a hypernym. In some embodiments, a pair of a hypernym and a hyponym can be identified by identifying phrases such as "is a", "is a type of", "include", etc. For example, if a sentence reads 'car is a type of a vehicle' then the phrase before "is a type of" (car) is a hyponym and the phrase after "is a type of" (vehicle) is a hypernym. In some embodiments, hypernyms and hyponyms for the first phrase can be retrieved and it can be determined whether the second phrase matches any of the retrieved hypernyms or hyponyms. If the second phrase matches any one of the retrieved hypernyms or hyponyms then there is a hyponymous relation between the first phrase and the second phrase. In some embodiments, the relationship identifier 451 retrieves hypernyms and hyponyms for the first phrase from Wordnet. In some embodiments, the relationship identifier 451 queries WolframAlpha for phrases that are narrower than the first phrase. If any of the narrower phrases matches the second phrase, then the first phrase is a hypernym and the second phrase is a hyponym. In some embodiments, the relationship identifier 451 queries WolframAlpha for phrases that are broader than the first phrase. If any of the broader phrases matches the second phrase, then the second phrase is a hypernym and the first phrase is a hyponym.

Another example of a semantic relationship is an instance-of relation or an example relation. For example, "Copenhagen" is semantically related to "capital" because "Copenhagen" is an example of a "capital". Similarly, "Nike" is semantically related to "shoe" because "Nike" is an example of a "shoe". In some embodiments, instance-of relations between two keyphrases can be identified using Wikipedia, dBpedia, or other databases that store linked data.

Another example of a semantic relationship is a locative relation in which one phrase indicates a location of a thing represented by another phrase. For example, in the sentence fragment 'Minorities in Denmark . . . '", "Minorities" and "Denmark" are semantically related because "Denmark" indicates the location of the "Minorities". In some embodiments, dBpedia can be used to identify locative relations. DBpedia includes relations about person, places and things. In some embodiments, locative relations can be identified through databases.

Another example of a semantic relationship is meronymy or a partitive relation in which one phrase represents a whole entity and the other phrase represents a part of the whole entity. A meronym means part of a whole, whereas a hyponym is a subset of what another word denotes. For example, "finger" is a meronym of a "hand" because "finger" is part of a "hand". Similarly, a "wheel" is a meronym of "automobile" because a "wheel" is a part of an "automobile". In some embodiments, Wordnet can be used to identify meronymy relations between phrases. For example, "hand", a first key phrase, can be sent to Wordnet to search for words related to "hand", the first key phrase. Wordnet can return part meronyms that include "digital arteries", "metcarpal artery", "intercapitular vein", "palm", and "finger". Since one of the returned meronyms, "finger", matches a second key phrase, "finger", there is a meronymy relation between "hand" and "finger".

In contrast to meronymy, another example of a semantic relationship is holonymy which is the opposite of meronymy. Holonymy defines a relationship between a term denoting the whole and a term denoting a part of, or a member of, the whole. 'X' is a holonym of 'Y', if Ys are parts of Xs. 'X' is a holonym of 'Y', if Ys are members of Xs. For example, "tree" is a holonym of "bark" because barks are parts of trees. "Tree" is also a holonym of "trunk" and "limb" because trunks and limbs are parts of trees. Similarly, "shoe" is a holonym of "lace" and "sole" because laces and soles are parts of shoes. In some embodiments, Wordnet can be used to identify holonymy relations between phrases. For example, "finger", a first key phrase, can be sent to Wordnet to search for words related to "finger", the first key phrase. Wordnet can return part holonyms that include "hand", "manus", "mitt" and "paw". Since one of the returned holonyms, "hand", matches a second key phrase, "hand", there is a holonymy relation between "finger" and "hand".

Another example of a semantic relation is a paradigmatic relation in which the relationship between two concepts is considered to be either fixed by nature, self-evident, or established by convention. For example, "mother" and "child", "fat" and "obesity", a state and its capital, etc. Paradigmatic relations may be identified using one of the methods discussed above.

Another example of a semantic relationship is polysemy which is the ability of a phrase to have multiple related meanings A polyseme is a word or phrase with different, but related senses. A polyseme is semantically related to each of its meanings. For example, "to get" can mean "procure" (e.g. 'I'll get the drinks') "To get" can also mean "become" (e.g. 'He wanted her to get scared'). "To get" can also mean "have" (e.g. 'I need to get seventy million dollars for this idea'). "To get" can also mean "understand" (e.g. 'I have to get this concept before tomorrow's test'). In this example, "to get" is related to "become", "have" and "understand". Polysemy relations may be identified using one of the methods discussed above.

Another example of a semantic relationship is a relation between a possessor and what is possessed. For example, "owner" and "house" can be related because the house is possessed by the owner. This relation may be identified using one of the method described above.

Another example of a semantic relationship is synonymy in which two phrases have the same or substantially the same meanings (i.e. the two phrases are equivalent to each other). In some embodiments, a thesaurus, Wordnet, WolframAlpha, or any other knowledge engine or database can be used to identify a synonymy relation.

Another example of a semantic relation is a temporal relation in which a phrase indicates a specific time, a time period or a time duration of an event designated by another phrase. For example, "July 4" and "Independence Day", "July 1" and "Canada Day", "December 25" and "Christmas", "1939-1945" and "Second World War", etc. In some embodiments, dBpedia can be used to identify temporal relations. For example, dBpedia can be searched for a record related to a first phrase, "Independence Day", and it can be determined whether a value of a date field of the record matches a second phrase, "July 4". If the value of the date field matches the second phrase, then there is a temporal relation between the first phrase, "Independence Day" and the second phrase, "July 4".

In some embodiments, dbpedia can be used to identify relationships between a first key phrase and a second key phrase. The relationship identifier 451 can search dbpedia for a record related to or belonging to the first key phrase. The relationship identifier 451 can then determine whether the second key phrase matches a value of a field of the record related to or belonging to the first key phrase. If the second phrase matches a value of any field of the record related to or belonging to the first key phrase, then the first key phrase and the second key phrase are related. The type of the relation between the first key phrase and the second key phrase can be the name of the field which has a value that matches the second phrase. The type of relation can be a synonym of the name field, a hypernym of the name field, a holonym of the name field, or any other phrase semantically related to the name field.

In an example embodiment, a SPARQL query is used to query Wordnet for words that are cognitive synonyms of the first key phrase. For example, Wordnet is queried for hypernyms of the first key phrase using the following query statement: SELECT hypernyms (word, level) WHERE word='art'. Upon receiving words from Wordnet in response to the query, the received words are compared with the second key phrase and if the second key phrase matches any of the received hypernyms, then the second key phrase is a hypernym of the first key phrase. In an example embodiment, the entire Wordnet database is imported and stored in the memory 111 to avoid accessing Wordnet over a public network.

At 640, if a relation exists, then the method 600 proceeds to 650. If a relation does not exist, then the method 600 proceeds to 660.

At 650, an indication of the relation is sent. The indication can indicate the type of the relation. For example, the indication can indicate that the type of the relation includes a hyponymous relation. The indication can indicate a role of the first phrase in the relationship. For example, the indication can indicate that the first phrase is a hypernym. The indication can indicate a role of the second phrase in the relationship. For example, the indication can indicate that the second phrase is a hyponym. The relationship identifier 451 can send the indication of the relation to the output generator 481.

At 660, if a relation does not exist between the first phrase and the second phrase, an indication of the lack of a relation can be sent from the relationship identifier 451 to the output generator 481.

At 670, the method 600 ends.

Figure 7:
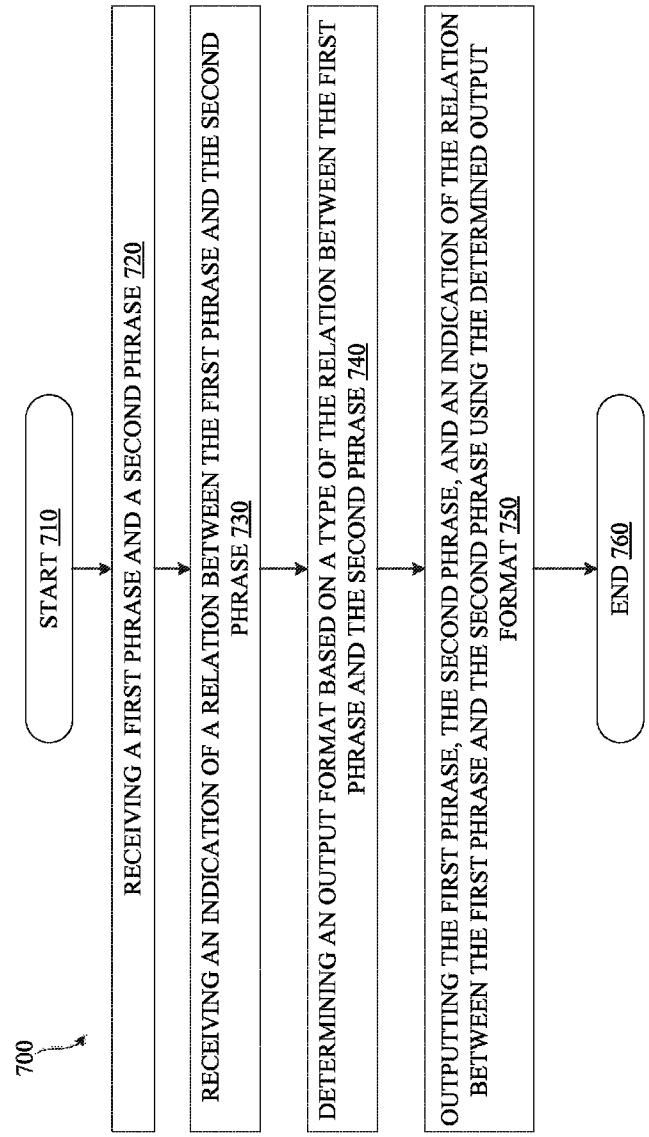
FIG. 7 is a flow diagram illustrating an example method for outputting the key phrases and an indication of the relation between the key phrases.

FIG. 7 shows a method 700 for generating an output to present a first key phrase, a second key phrase and a relation between the first key phrase and a second key phrase.

At 710, the method 700 starts.

At 720, a first key phrase and a second phrase are received. In some embodiments, the output generator 481 receives the first phrase 447 and the second phrase 449 from the phrase identifier 421.

At 730, an indication of a relation between the first key phrase and the second key phrase is received. The indication of the relation can include the type of the relation (e.g. hyponymous, holonymy, etc). In some embodiments, the output generator 481 receives a value indicating the relationship 479 between the first phrase 447 and the second phrase 449. For example, if the relationship 479 was identified to be a hyponymous relation, then the output generator 481 can receive "hyponymous", "hyponymy", or a number which matches to hyponymous relation in a lookup table.

A role of the first key phrase and a role of the second key phrase can also be received. For example, the output generator 481 can receive information indicating that the first phrase 447 is a hypernym and the second phrase 449 is a hyponym.

At 740, an output format is determined. As will be explained, in relation to FIGS. 8 to 15, the output format can include an image, a video, an audio, a concept map, a Venn diagram, a map, or a combination thereof. In some embodiments, the output format can be determined based on the type of the relation between the first key phrase and the second key phrase. For example, if the type of the relation is meronymy or holonymy, then Venn diagrams can be used. In another example, if the type of the relation is hyponymous, then a concept map can be used. In some embodiments, the output format can be determined based on the user's preferences. For example, if the user prefers to watch videos then the output can include a video. In another example, if the user prefers to view images then the output can include an image. In yet another example, if the user prefers to listen to audio, then the output can include audio. The user's preferences can be specified explicitly, for example by the user. The user's preferences can also be determined automatically. For example, by analyzing data associated with the user's Facebook account, Twitter account, Desire2Learn account, Gmail account, etc. In some embodiments, the output format can be determined based on the domain of the input. For example, if the domain includes physics then concept maps can be selected as the preferred output format. In another example, if the domain includes history then timelines can be selected as the preferred output format.

At 750, the first key phrase, the second key phrase and an indication of a relation between the first key phrase and the second key phrase are outputted using the output format determined at 740. Examples of output formats will be discussed in conjunction with FIGS. 8 to 15.

At 760, the method 700 ends.

Figure 8:
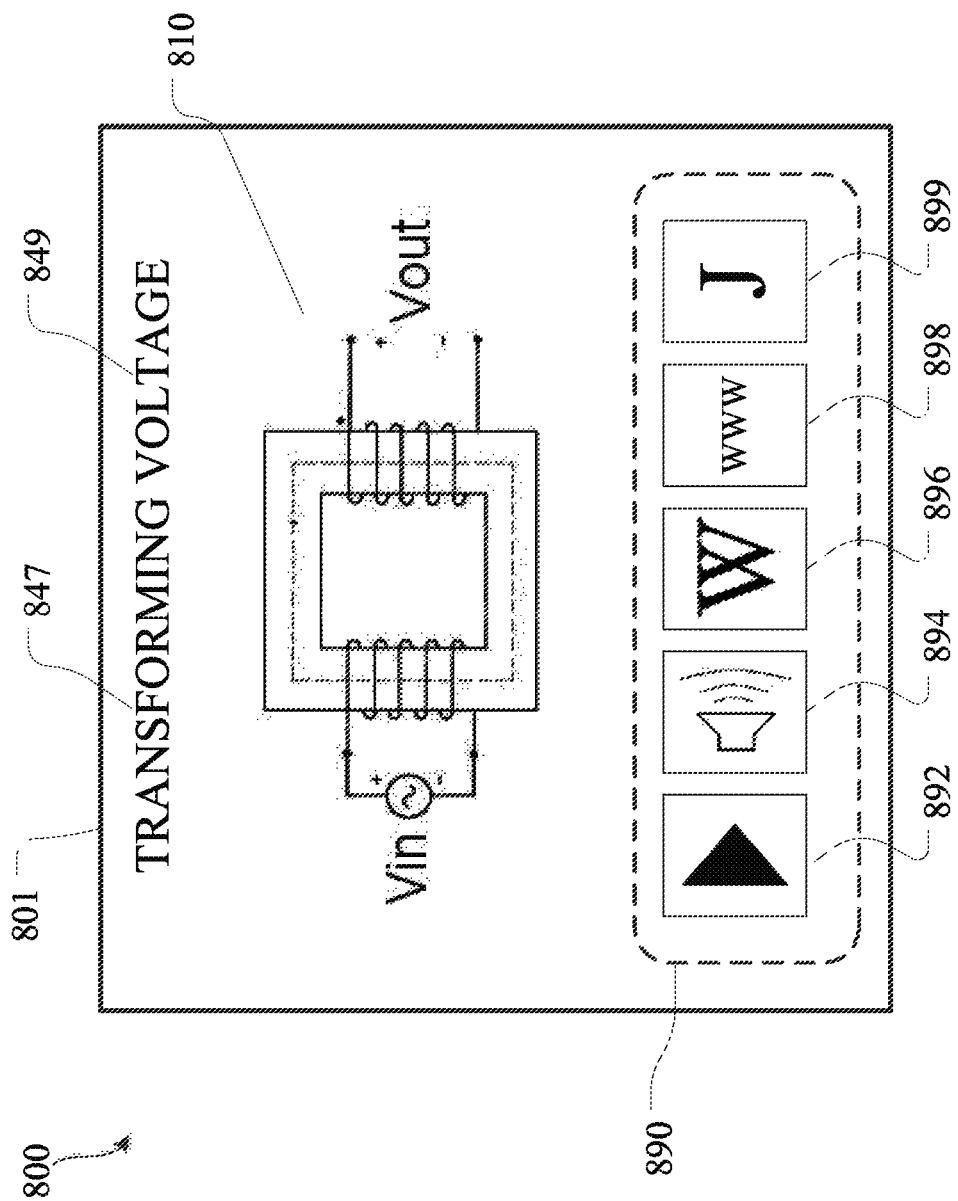
FIG. 8 is a diagram illustrating an example output where the relation between the key phrases is an active relation.

FIG. 8 shows an exemplary output 800. The output 800 can be outputted through the output device 105. The output 800 includes a user interface 801. In this example, the first phrase 847 ("transforming") and the second phrase 849 ("voltage") are related to each other through an active relation. An image 810 can be displayed to indicate the active relation between the first phrase 847 and the second phrase 849. Further, a caption that includes both the first phrase 847 and the second phrase 849 can be displayed adjacent to the image, for example "Transforming voltage", as can be seen in FIG. 8. The image can be retrieved from a database, such as dbpedia, Wikipedia, or through a search engine, such as Google. The image can be a gif, a jpeg, or the like.

Furthermore, a multimedia resource bar 890 can be displayed. The multimedia resource bar 890 can include multimedia resources that are related to the first phrase 847 and the second phrase 849. The multimedia resource bar 890 can include a video resource 892, an audio resource 894, a Wikipedia resource 896, a web resource 898, and a journal resource 899.

The video resource 892 can include a video from Youtube, Khan academy, Coursera, Udemy, MIT Opencourseware, Google videos, or any other video database. The video resource 892 can be retrieved by querying the database for a video related to both the first phrase 847 and the second phrase 849. For example, Youtube can be queried for "transforming voltage", and the most relevant video returned by Youtube can be presented via the output device 105.

The audio resource 894 can include an audio recording or podcast. The audio resource 894 can include the audio portion of the video resource 894. Less bandwidth can be used to receive only the audio portion of the video resource 892 via the audio resource 894.

The Wikipedia resource 896 can include a link to a Wikipedia page. The Wikipedia resource 896 can include text that includes both the first phrase 847 and the second phrase 849. The text can include the first phrase 847 and the second phrase 849 in the same sentence or the same paragraph and that sentence or paragraph with both the first phrase 847 and the second phrase 849 can be presented via the output device 105.

The web resource 896 can include a link to a website. The web resource 896 can include text from a website, the text can include both the first phrase 847 and the second phrase 849. The text can include the first phrase 847 and the second phrase 849 in the same sentence or the same paragraph and that sentence or paragraph including both the first phrase 847 and the second phrase 849 can be presented via the output device 105.

The journal resource 899 can include journals, such as scientific journals. The journal resource 899 can include journals that are retrieved from journal databases. The journal resource 899 can include information that may not be readily available on a website. For example, the journal resource 899 can include research papers or publications that are only available through a paid subscription of a journal. An example of a journal is Science, also widely known as the Science magazine. Another example of a journal is Nature. Sources for the journal resource 899 can be selected based on the domain of the input. For example, if the domain includes economics then journals related to economics are consulted. Some of the journal databases may require login credentials, the login credentials can be received through the $3^{rd}$ party login plugin 243 or 343.

Resources in the multimedia resource bar 890 can be changed. The user can add and remove resources from the multimedia resource bar 890. For example, the user can remove the audio resource 894 from the multimedia resource bar 890, perhaps, because the user does not like to listen to audio without an accompanying video. In another example, the user can change the Wikipedia resource 896 to a Britannica encyclopedia resource, a dbpedia resource, a WolframAlpha resource, or any other electronic resource that the user prefers, perhaps, because the user does not trust the reliability of Wikpedia.

Resources in the multimedia resource bar 890 can be changed automatically. In some embodiments, the user's resource preferences can be determined and resources can be selected based on the user's resource preferences. For example, the user's browser history can be analyzed and if the browser history analysis reveals that the user rarely visits Wikipedia but frequently visits Britannics then the user likely prefers to use Britannica instead of Wikipedia and the Wikipedia resource 896 can be replaced with a Britannica resource.

Figure 9:
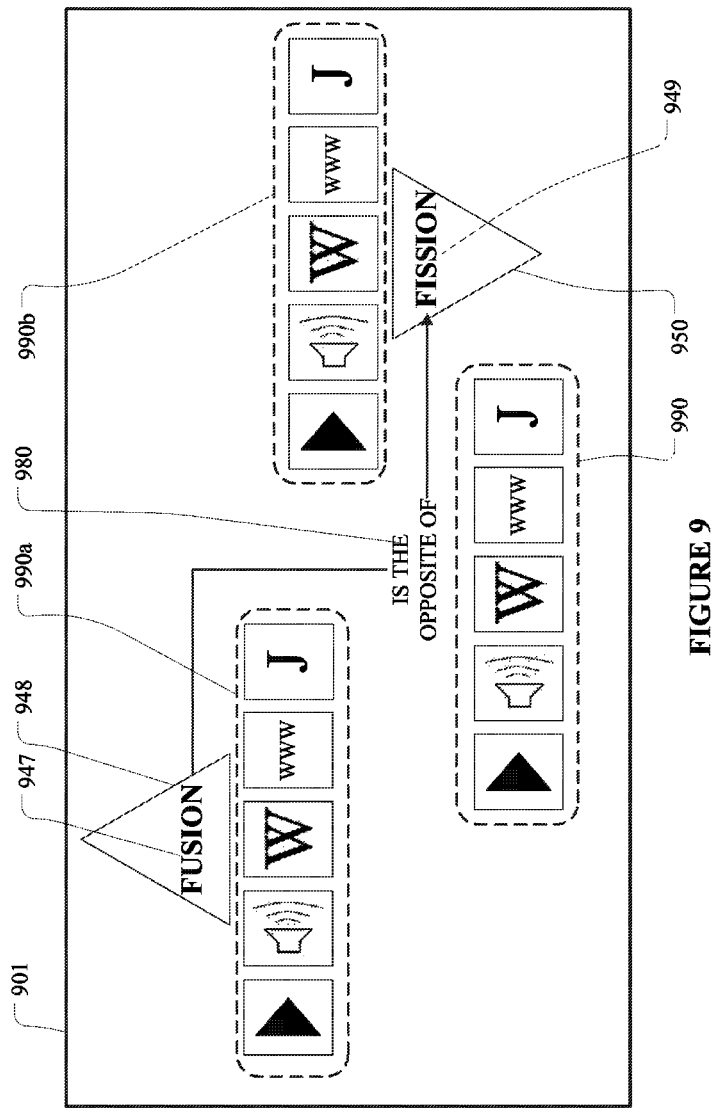
FIG. 9 is a diagram illustrating an example output where the relation between the key phrases is an antonymy relation.

FIG. 9 shows another exemplary output. The user interface 901 shows a first phrase 947 ("Fusion") and a second phrase 949 ("Fission"). The first phrase 947 and the second phrase 949 are related through antonymy. The antonymy relation between the first phrase 947 and the second phrase 949 can be shown by displaying the first phrase 947 in a triangle 948 and displaying the second phrase 949 in an inverted triangle 950. The triangle 948 and the inverted triangle 950 are indicative of the opposite meanings of the first phrase 947 and the second phrase 949. In some embodiments, antonymy can be shown by displaying phrases in different colors. For example, by displaying one key phrase in red and displaying the other key phrase in green. The user interface 901 also displays a connecting phrase 980 ("is the opposite of"). The connecting phrase 980 also indicates the antonymy relation.

The user interface 901 can display three multimedia resource bars 990, 990a, and 990b that are similar to the multimedia resource bar 890 described earlier. The multimedia resource bar 990a can display multimedia resources that are related to the first phrase 947 ("Fusion"). For example, the multimedia resource bar 990a can show a video for fusion, a Wikpedia article on fusion, a journal on a new type of fusion reactor, etc. The multimedia resource bar 990b can display multimedia resources that are related to the second phrase 949 ("Fission"). For example, the multimedia resource bar 990b can show a video for fission, a Wikipedia article on fission, a web story about the nuclear mishap in Japan, etc. The multimedia resource bar 990 can display multimedia resources that were found based on the first phrase 947, the second phrase 949 and the antonymy relation between the first phrase 947 and the second phrase 949. For example, the multimedia resource bar 990 can display a video comparing and contrasting the first phrase 947 ("fusion") with the second phrase 949 ("fission"). The resources in the multimedia bar 990 can be retrieved by querying a database or a search engine using a search phrase that includes the first phrase 947 ("fusion"), the antonymy relation, and the second phrase 949 ("fission"). For example, the search phrase can be "fusion versus fission", where "versus" indicates the antonymy relation.

Figure 10:
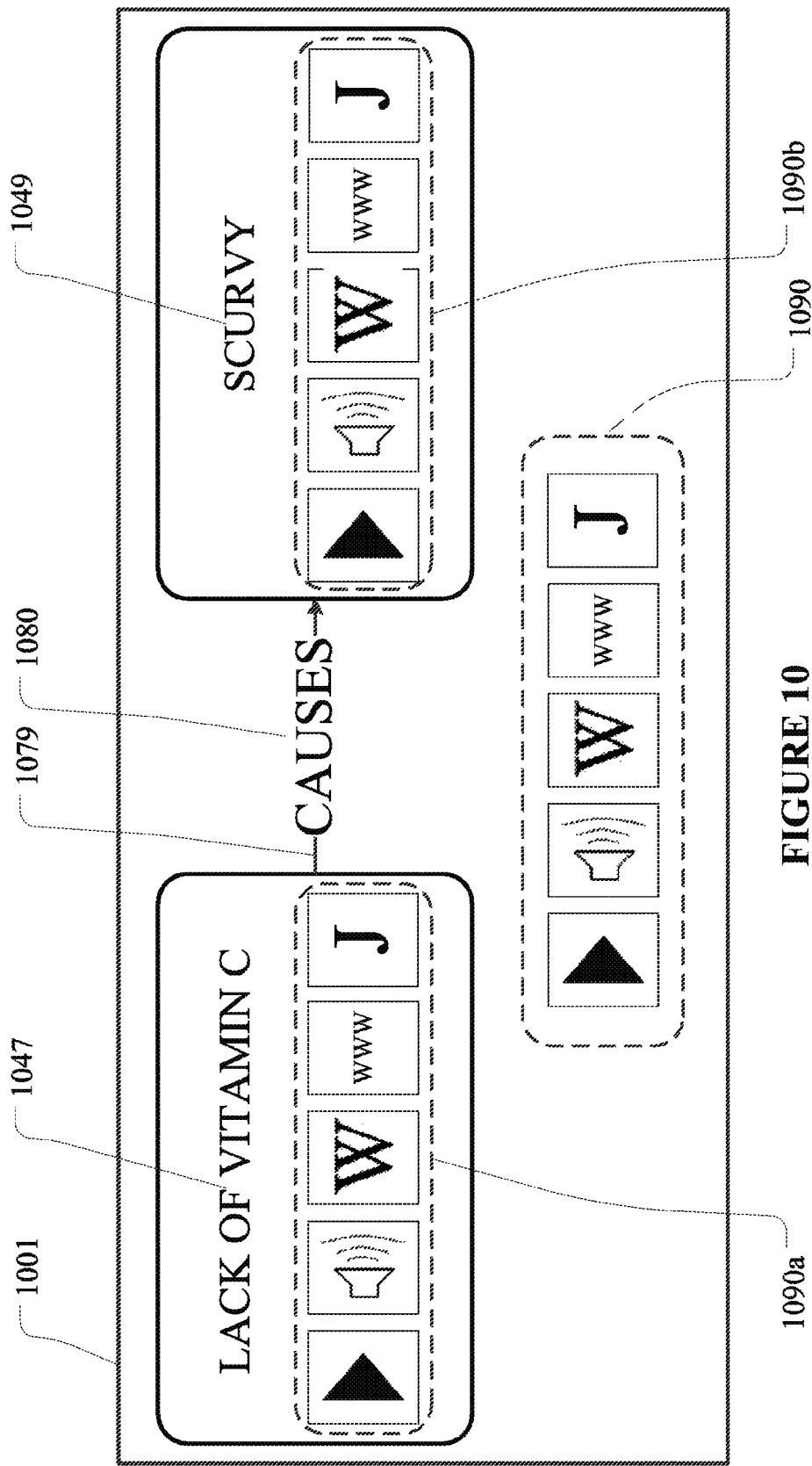
FIG. 10 is a diagram illustrating an example output where the relation between the key phrases is a causal relation.

FIG. 10 shows another exemplary output. The user interface 1001 shows a first phrase 1047 ("lack of Vitamin C") and a second phrase 1049 ("Scurvy"). The first phrase 1047 and the second phrase 1049 are related through a causal relation. The causal relation between the first phrase 1047 and the second phrase 1049 can be shown by displaying an arrow 1079 from the first phrase 1047 to the second phrase 1049. The arrow 1079 is indicative of the causal relation between the first phrase 1047 and the second phrase 1049. The user interface 1001 can display a connecting phrase 1080 ("causes"). The connecting phrase 1080 can indicate the causal relation.

The user interface 1001 can display three multimedia resource bars 1090, 1090a, and 1090b that are similar to the multimedia resource bar 890 described earlier. The multimedia resource bar 1090a can display multimedia resources that are related to the first phrase 1047 or a portion of the first phrase 1047 ("Vitamin C"). For example, the multimedia resource bar 1090a can show a journal that discusses the benefits of Vitamin C, a web resource that mentions the sources of Vitamin C, a video commercial on Vitamin C supplements, etc. The multimedia resource bar 1090b can display multimedia resources that are related to the second phrase 1049 ("Scurvy"). For example, the multimedia resource bar 1090b can show a video on the symptoms of Scurvy, a Wikipedia article on Scurvy, a web story about a Scurvy outbreak, etc. The multimedia resource bar 1090 can display multimedia resources that were found based on the first phrase 1047, the second phrase 1049 and the causal relation between the first phrase 1047 and the second phrase 1049. For example, the multimedia resource bar 1090 can display a video that explains how the first phrase 1047 ("lack of Vitamin C") causes the second phrase 1049 ("scurvy"). The resources in the multimedia bar 1090 can be retrieved by querying a database or a search engine using a search phrase that includes a portion of the first phrase 1047 ("Vitamin C"), the causal relation, and the second phrase 1049 ("scurvy"). For example, the search phrase can be "Vitamin C causes Scurvy", where "causes" indicates the causal relation.

In some embodiments, if the type of relation between the first key phrase and the second key phrase is homonymy, then the first key phrase and the second key phrase can be displayed along with their corresponding meanings so that the difference in their meanings is apparent. The first key phrase and/or its corresponding meaning can be presented in a different manner from the second key phrase and/or its corresponding meaning to accentuate the difference in the meanings of the first key phrase and the second key phrase. For example, if the first key phrase is "aid" and the second key phrase is "aide", then "aid" can be displayed in green font and "aide" can be displayed in red font to indicate the conceptual difference between "aid" and "aide". Further, the meaning of "aid" (to assist) and the meaning of "aide" (an assistant) can also be displayed to illustrate the conceptual divide between the two key phrases.

Figure 11:
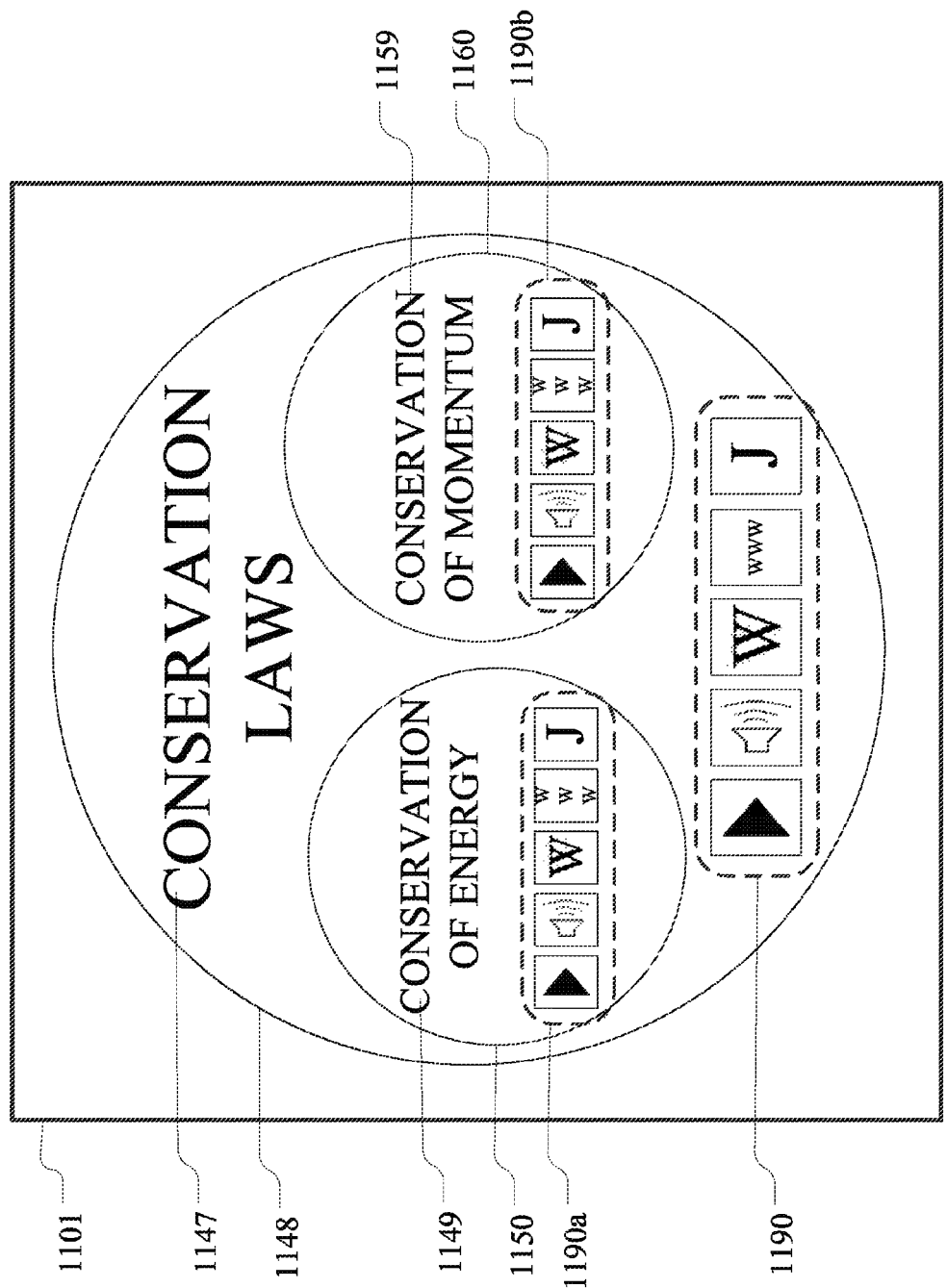
FIG. 11 is a diagram illustrating an example output where the relation between the key phrases is an instance-of relation, a hyponymous relation, a meronymy relation or a holonymy relation.

FIG. 11 shows another exemplary output. The user interface 1101 shows a first phrase 1147 ("Conservation laws") and a second phrase 1149 ("Conservation of energy"). The first phrase 1147 and the second phrase 1149 can be related through an example or instance-of relation because the second phrase 1149, "conservation of energy", is an example of the first phrase 1147, "conservation laws". The first phrase 1147 and the second phrase 1149 can be related through a hyponymous relation because the first phrase 1147, "conservation laws", can be a hypernym and the second phrase 1149, "conservation of energy", can be a hyponym. The first phrase 1147 and the second phrase 1149 can be related through meronymy and holonymy because the first phrase 1147, "conservation laws", can be a holonym and the second phrase 1149, "conservation of energy", can be a meronym. As can be seen in FIG. 11, the relation between the first phrase 1147 and the second phrase 1149 can be illustrated through a Venn diagram. The first phrase 1147 is enclosed in a polygon 1148. The second phrase 1149 is enclosed in a polygon 1150. The polygon 1150 is placed within the confines of the polygon 1148 to illustrate that the second phrase 1149 is an example, a meronym or a hyponym of the first phrase 1147. The polygons 1148 and 1150 are shown as ellipses. In some embodiments, the polygons 1148 and 1150 can be formed using different shapes, such as circles, square, rectangles, triangles, parallelograms, etc. The polygon 1150 corresponding with the second phrase 1149 is placed entirely within the boundaries of the polygon 1148 corresponding with the first phrase 1147. In some embodiments, the polygon 1150 corresponding with the second phrase 1149 may only partially overlap with the polygon 1148 corresponding with the first phrase 1147, for example to illustrate a part meronymy/holonymy type relation. Similar to the second phrase 1149, a third phrase 1159 is also shown. The third phrase 1159 is enclosed in a polygon 1160. The third phrase 1159 can be a meronym, an example, or a hyponym of the first phrase 1147.

The user interface 1101 can display three multimedia resource bars 1190, 1190*a*, and 1190*b* that are similar to the multimedia resource bar 890 described earlier. The multimedia resource bar 1190*a* can display multimedia resources that are related to the second phrase 1149 or a portion of the second phrase 1149 ("conservation of energy"). For example, the multimedia resource bar 1190*a* can show a Wikipedia article on the conservation of energy, a video on how conservation of energy works for a pendulum, a journal research paper on how energy can be conserved. The multimedia resource bar 1190*b* can display multimedia resources that are related to the third phrase 1159 ("conservation of momentum"). For example, the multimedia resource bar 1190*b* can show a Wikipedia article on the conservation of momentum, a video from MIT Opencourseware demonstrating the conservation of momentum, etc. The multimedia resource bar 1190 can display multimedia resources that were found based on the first phrase 1147, the second phrase 1149, the third phrase 1159 and the relation between the first phrase 1147, the second phrase 1149, and the third phrase 1159. For example, the multimedia resource bar 1190 can display a video that explains the first phrase 1147, "conservation laws", in general and provides the second phrase 1149, "conservation of energy", and the third phrase 1159, "conservation of momentum", as examples during the video. The multimedia resource bar 1190 can display a web resource that discusses the first phrase 1147, "conservation laws", and provides the second phrase 1149, "conservation of energy", and the third phrase 1159, "conservation of momentum" as examples.

In some embodiments, the relation between a first key phrase and a second key phrase includes a locative relation. For example, the first key phrase can be "crime" and the second key phrase can be "America". In locative relations, one phrase represents a location and another phrase represents an object, an entity or a concept related to the location. In the example provided above, the input can discuss "crime" in "America", therefore such a relation can be illustrated by displaying a map of America and an indication of "crime" in America, as can be seen in FIG. 12.

Figure 12:
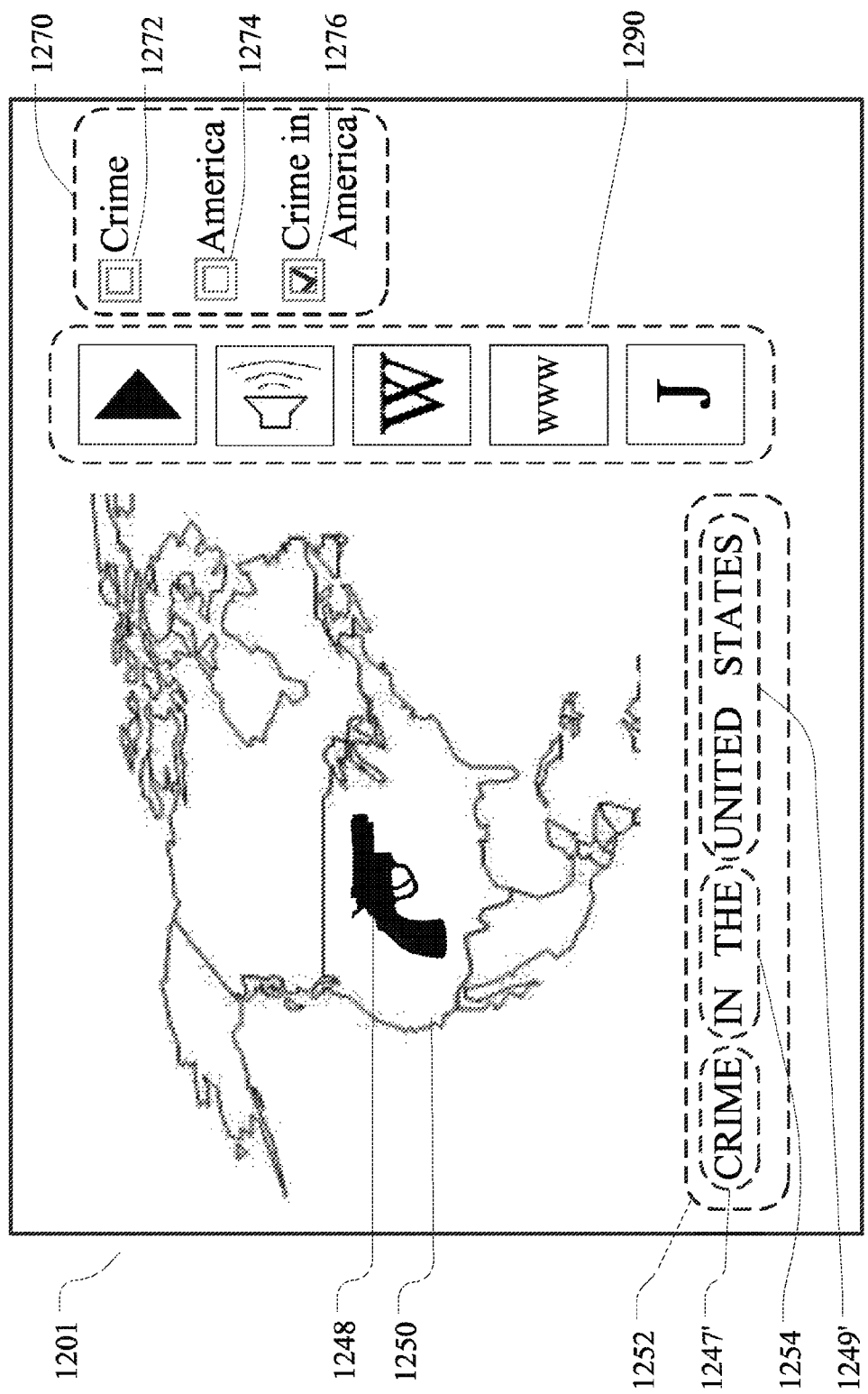
FIG. 12 is a diagram illustrating an example output where the relation between the key phrases is a locative relation.

FIG. 12 shows a user interface 1201 that displays a map that includes the location represented by the second phrase, "America". The user interface 1201 can display a gun 1248 which is a visual representation of the first phrase, "crime". In this example, the gun 1248 is a visual representation of the first phrase, "crime", because "crime" and "gun" are related through a causal relation (i.e. guns can cause crime). The visual representation of the first phrase can include an image of an object that represents the first phrase or a related phrase, such as a synonym, a hypernym, a hyponym, a meronym, a holonym, a causal-related phrase of the first phrase. The image can be retrieved from a database such as dbpedia, Wikipedia or a search engine, such as Google. The image can be selected in a manner such that copyright laws are not violated. For example, copyrighted images can be filtered out.

The user interface 1201 can display a caption 1252. The caption can include the first phrase or a variation of the first phrase 1247', the second phrase or a variation of the second phrase 1249' and a connecting phrase 1254. The connecting phrase 1254 can be selected in a manner such that a concatenation of the phrase 1247', the connecting phrase 1254 and the phrase 1249' results in a string with sufficient sentence fluency or flow. The connecting phrase 1254 can be selected from a database of candidate connecting phrases. The output generator 481 can select a candidate connecting phrase, and form a candidate caption by concatenating the phrase 1247', the candidate connecting phrase and the phrase 1249'. The output generator 481 can then assess the sentence fluency or the flow of each of the candidate captions and select the candidate caption with the highest sentence fluency or flow. The sentence fluency or flow of a candidate caption can be quantified by searching the candidate caption in a search engine and receiving a number of results or hits for the candidate caption. The candidate caption with the highest number of results or hits can be selected as the caption 1252. In generating candidate captions, the output generator 1281 can select variations of the first phrase, variations of the second phrase, and candidate connecting phrases from a database of connecting phrases. The database can include candidate connecting phrases for different types of relations. For example, if the relation is a locative relation then possible connecting phrases can include "in", "near", "close to", "away from", etc. If the relation is a causal relation then possible connecting phrases can "causes", "is caused by", "due to", "resulting from", etc.

The user interface 1201 can include a multimedia resource bar 1290 that can include resources such as a video about the crime levels in USA, a website that discusses that $2^{nd}$ amendment and Americans' right to bear arms, etc. The user interface 1201 can include additional multimedia resource bars. For example, the user interface 1201 can include a multimedia resource bar that shows resources related to only the first phrase, "crime", for example news about the most recent crimes. Similarly, the user interface 1201 can include a multimedia resource bar that shows resources related to only the second phrase, "America", for example a wikpedia page about America.

The multimedia resource bar 1290 can be configured so that the multimedia resource bar 1290 can show resources that are only related to the first phrase ("America"), or resources that are only related to the second phrase ("America"). The multimedia resource bar 1290 can be configured by the user through configuration options 1270 that include checkboxes 1272, 1274, and 1276. Selecting checkbox 1272 results in the multimedia resource bar 1290 showing resources that are primarily related to the first phrase, "crime". Resources primarily related to the first phrase can be retrieved by querying databases (e.g. Wikipedia, dbpedia), search engines (e.g. Google), and computational knowledge engines (e.g. WolframAlpha) using the first phrase ("crime") or a slight variation of the first phrase (e.g. "guns"). Selecting checkbox 1274 results in the multimedia resource bar 1290 showing resources that are primarily related to the second phrase, "America". Resources primarily related to the first phrase can be retrieved by querying databases (e.g. Wikipedia, dbpedia), search engines (e.g. Google), and computational knowledge engines (e.g. WolframAlpha) using the second phrase ("America") or a slight variation of the second phrase (e.g. "United States"). Selecting checkbox 1276 results in the multimedia resource bar 1290 showing resources that are related to both the first phrase ("crime") and the second phrase ("America"). Further, the resources can be made even more specific by also using the relation between the first phrase and the second phrase to retrieve the resources. Resources related to the first phrase, the second phrase and the relation between the first phrase and the second phrase can be retrieved by querying databases (e.g. Wikipedia, dbpedia), search engines (e.g. Google), and computational knowledge engines (e.g. WolframAlpha) using the caption 1252 or slight variations of the caption 1252.

In some embodiments, the relation between a first key phrase and a second key phrase includes a holonymy or a meronymy relation. For example, the first key phrase can be "car" and the second key phrase can be "wheels". A "wheel" is a meronym of a "car" because "wheels" are a part of the "car". Holonymy and meronymy relations can be illustrated by displaying an image of an object that represents the holonym (e.g. car) and identifying a portion of the image that represents the meronym (e.g. wheels), as can be seen in FIG. 13.

Figure 13:
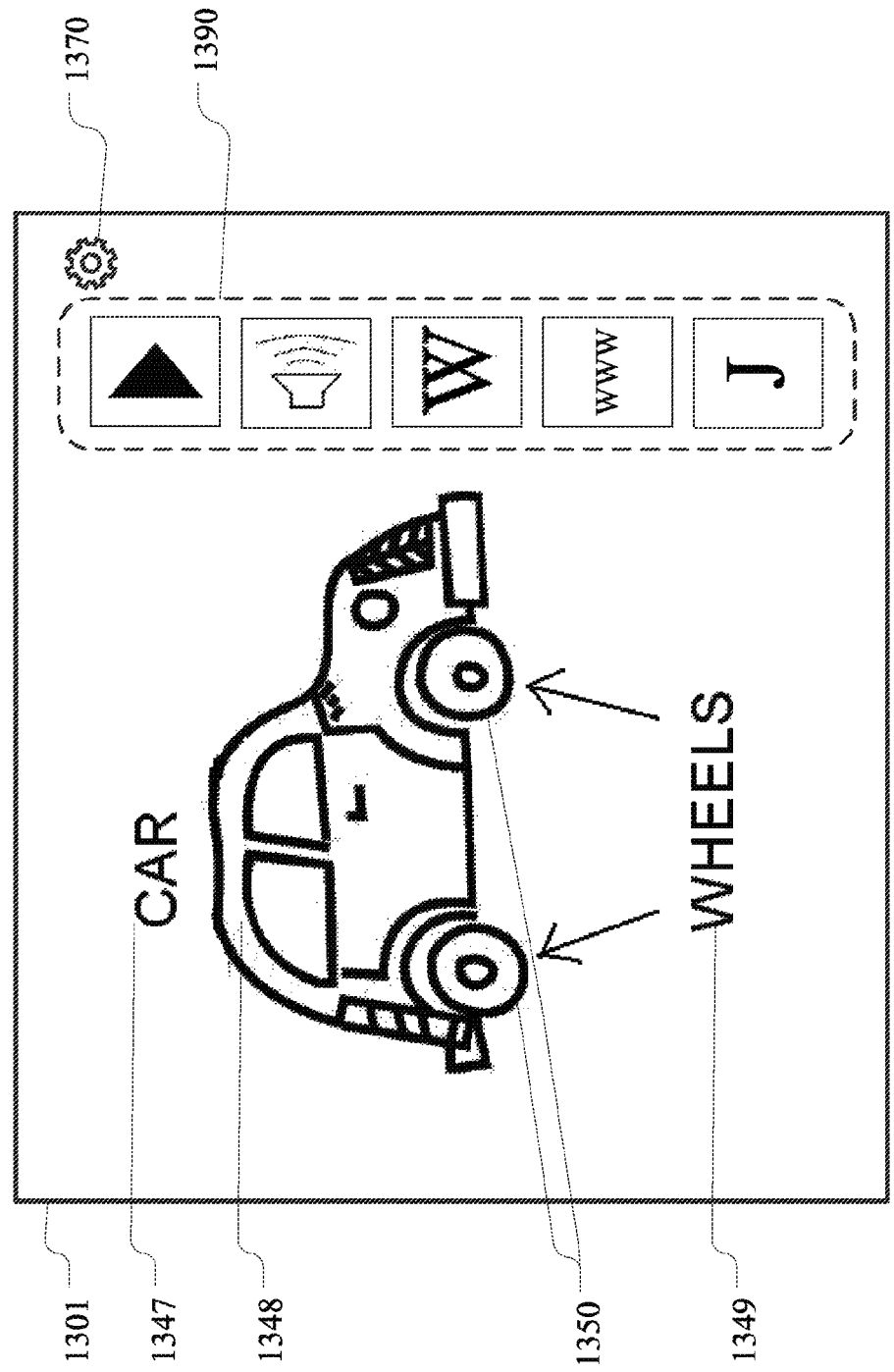
FIG. 13 is a diagram illustrating an example output where the relation between the key phrases is a meronymy or a holonymy relation.

FIG. 13 shows a user interface 1301. The user interface 1301 can display a first phrase 1347 ("car") and an image 1348 (e.g. an image of the car) that visually represents the first phrase 1347. The user interface 1301 can display the second phrase 1349 ("wheels") and identify a portion 1350 (e.g. the wheels of the car) that visually represent the second phrase 1349 ("wheels"). The image 1348 can be retrieved by querying a database (e.g. Wikipedia, dbpedia), or searching a search engine (e.g. Google) for images corresponding with the first phrase 1347 ("car").

The portion 1350 can be identified using digital image processing techniques. In some embodiments, another image corresponding with the second phrase 1349 ("wheels") is retrieved. Portions of the car image 1348 can be compared with the wheel image and if a portion of the car image 1348 matches the wheel image then the matching portion of the car image 1348 is identified as a wheel. The portion 1350 of the car image 1348 can be annotated, for example arrows can be drawn to point at the portion 1350 and the portion 1350 can be labeled with "wheels". In some embodiments, the portion 1350 can be colored to highlight.

The multimedia resource bar 1390 is similar to the multimedia resource bar 1290. The multimedia resource bar 1390 can be configured to display resources that relate to cars, wheels, or to resources that are about cars but with an emphasis on wheels. The configuration can be changed by the user through configuration options 1370 similar to the configuration options 1270.

Figure 14:
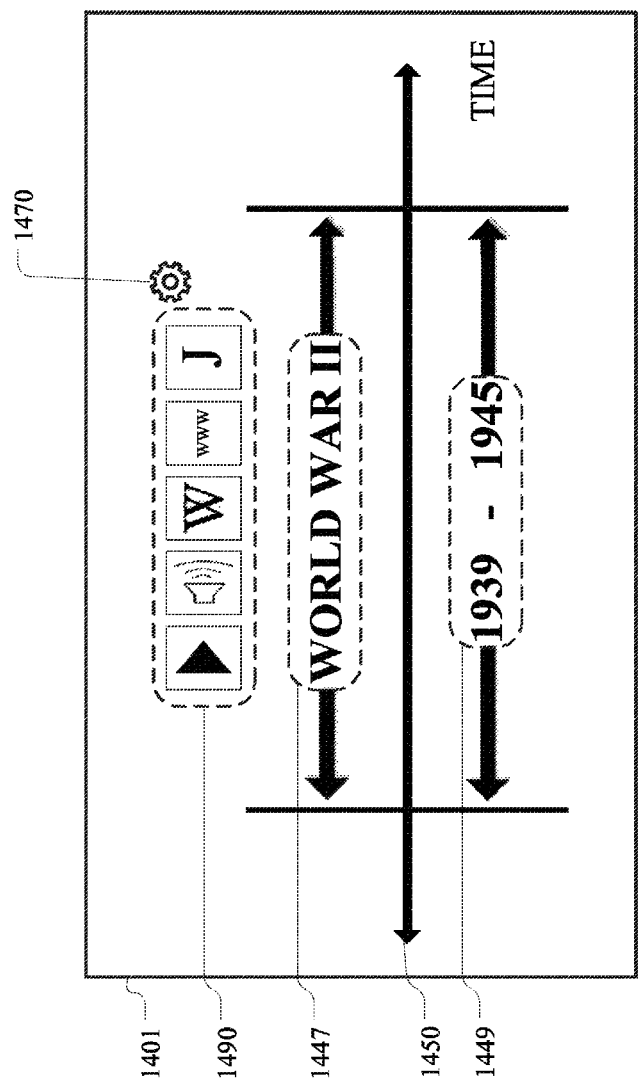
FIG. 14 is a diagram illustrating an example output where the relation between the key phrases is a temporal relation.

FIG. 14 shows a user interface 1401. The user interface 1401 shows a first phrase 1447 ("World War II") and a second phrase 1449 ("1939-1945"). The first phrase 1447 ("World War II") and the second phrase 1449 ("1939-1945") are temporally related because World War II took place during the years 1939 to 1945. The temporal relation between the first phrase 1447 ("World War II") and the second phrase 1449 ("1939-1945") can be illustrated by displaying the first phrase 1447 and the second phrase 1449 on a timeline 1450. The user interface 1401 can include a multimedia resource bar 1490, that is similar in operation to the multimedia resource bar 1290, and can display resources related to the first phrase 1447 ("World War II") and the second phrase 1449 ("1939-1945"). The configuration of the multimedia resource bar 1490 can be changed by the user through configuration options 1470 that are similar to the configuration options 1270.

Figure 15:
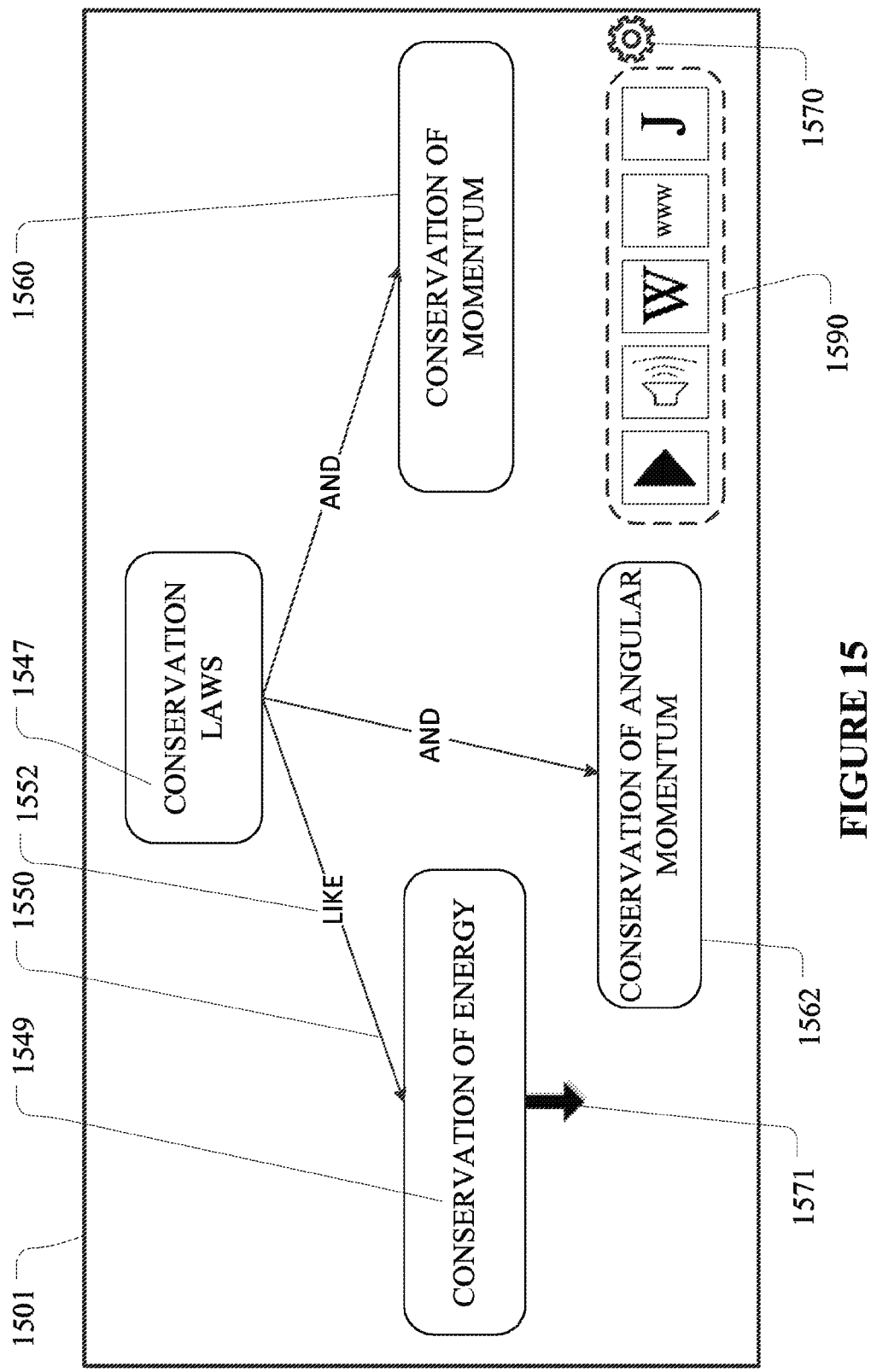
FIG. 15 is a diagram illustrating an example output where the relation between key phrases is indicated by displaying a concept map.
Figure 16:
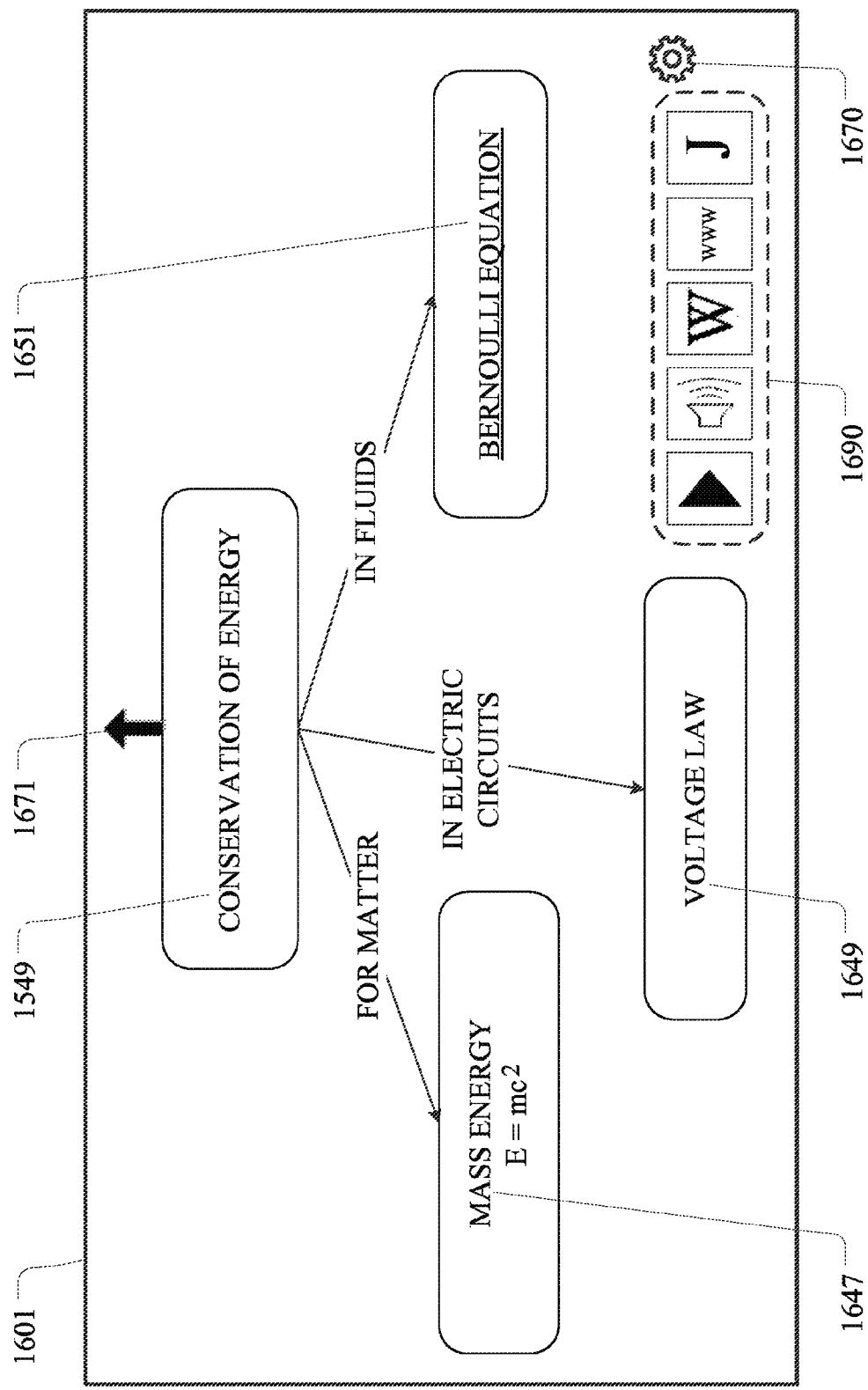
FIG. 16 is a diagram illustrating another example output where the relation between the key phrases is indicated by displaying another concept map.

FIGS. 15 and 16 show exemplary outputs that include concept maps. Concept maps can be used to illustrate hierarchical relations, such as hyponymous relations, instance-of/example relations, meronymy-holonymy relations, paradigmatic relations, or the relation between a possessor and an object possessed by the possessor.

FIG. 15 shows a user interface 1501. The user interface can include a first phrase 1547 ("conservation laws"), a second phrase ("conservation of energy") and an arrow 1550 connecting the first phrase 1547 with the second phrase 1549 to indicate a hierarchical relation between the first phrase 1547 and the second phrase 1549. A connecting phrase 1552 can be displayed adjacent to the arrow 1550. The connecting phrase 1552 can be selected in a manner such that a concatenation of the first phrase 1547, the connecting phrase 1552 and the second phrase 1549 results in a string with sufficient sentence fluency or flow. The connecting phrase 1552 can be selected from a database of candidate connecting phrases, similar to the selection of the connecting phrase 1254 described above. The user interface 1501 can also display a third phrase 1560 and a fourth phrase 1562 that are hierarchically related to the first phrase 1547. A multimedia resource bar 1590 can be displayed. Similar to the multimedia resource bar 1290, the multimedia resource bar 1590 can be configured through configuration options 1570 to present resources that are related to only the first phrase 1547, only the second phrase 1549, only the third phrase 1560, only the fourth phrase 1562, or to a combination of any of the phrases and the relation between the phrases. An indicator 1571 can be displayed to indicate that additional key phrases related to the second phrase 1549 have been identified. The additional key phrases can be viewed by selecting the indicator 1571.

FIG. 16 shows a concept map that can be displayed when the indicator 1571 is selected. The concept map in FIG. 16 can display additional key phrases 1647, 1649, 1651 that are related to the second phrase 1549. The multimedia resource bar 1690 can be updated to present resources that are more related to the key phrases 1549, 1647, 1649, 1651 that are being displayed by the user interface 1601. The multimedia resource bar 1690 can be configured through configuration options 1670. An indicator 1671 can be displayed to indicate that there is at least one additional key phrase that was identified and that is broader than the phrase 1549 or is higher than the phrase 1549 in a hierarchy. Upon selecting the indicator 1671, the user interface 1501 can be displayed.

Advantageously, by selecting the indicator 1571, the user can zoom into the concept represented by the second phrase 1549 ("conservation of energy"). By zooming into "conservation of energy" the user can learn more about the conservation of energy. This conceptual zoom allows the user to learn more details about the concept of "conservation of energy". By selecting the indicator 1671, the user can zoom out of conservation of energy and learn about the more general area of conservation laws.

In some embodiments, some phrases can be selected and upon selection of a particular phrase more information about that particular phrase can be presented. The phrases with additional available information can be displayed as a hyperlink and the additional information can be presented when the hyperlink is clicked. For example, in FIG. 16, the phrase 1651 ("Bernoulli Equation") can be a link and when "Bernoulli Equation" is clicked then the equation can be displayed. In some embodiments, when the phrase is clicked then excerpts from the input 401 can be displayed, or multimedia resources that have been retrieved from the internet can be presented, for example excerpts from a web resource such as Wikipedia can be displayed.

As mentioned earlier, in some embodiments, the input 401 can include an electronic textbook ("ebook" hereinafter). The ebook can be segregated into its individual chapters. Key phrases in each chapter can be identified by the phrase identifier 421. The relations between the key phrases can be identified by the relationship identifier 451. A concept map, similar to the concept maps shown in FIGS. 15 and 16, can be generated for each chapter in the ebook. The concept map for each chapter can be inserted into the ebook before the chapter. Advantageously, when a student starts reading a chapter the student can review the concept map for the chapter to get a conceptual understanding of the chapter before expending time in reading the entire chapter.

As mentioned earlier, in some embodiments, the input 401 can include an audio input. In an example, a student user can record a lecture and upload the audio file for the lecture through the user interface 201 or 301. The audio in the audio file can be converted to text to generate a transcript of the lecture. The conversion to text can be achieved using speech-to-text algorithms. The phrase identifier 401 can identify key phrases in the text. The relationship identifier 451 can identify the relations between the key phrases. The output generator 481 can generate an audio output that includes the key phrases and can also include connecting phrases that connect the key phrases. In addition to the audio output, the output generator 481 can generate a visual output as well, such as a concept map. The connecting phrases can be selected in the same manner as the connecting phrase 1254. Advantageously, a long lecture can be condensed into a few minutes or even seconds of audio output generated by the output generator 481. The student user can obtain at least a broad conceptual understanding of the lecture without having to listen to the entire lecture.

In some embodiments, the input can include text and audio. For example, a student user can type notes during a lecture and record the lecture. The student user can then upload the student user's typed notes and the audio recording of the lecture. The audio recording of the lecture can be converted into text using speech-to-text algorithms. The phrase identifier 421 can identify key phrases in both the student user's typed notes and the text corresponding with the audio. The relationship identifier 451 can identify relations between all the identified key phrases and the output generator 481 can display an output showing all the identified key phrases and the relations between them. Advantageously, the student user is presented with a conceptual overview of concepts that are not only captured by the student user in the student user's notes but that were also discussed by the professor during the lecture.

In some embodiments, the user can provide information pertaining to the user and the information can be used by the phrase identifier 421, the relationship identifier 451, or the output generator 481. For example, the user can provide the user's school name, the user's program of study, and the user's major. The user can also provide a course name, a course number, a professor name, or a textbook name that relate to the input 401. The course name, the course number or the professor name can be used to search for a textbook that the user's professor may have assigned for reading. Glossary terms from the textbook assigned by the user's professor can be added to the vocabulary that is used by the phrase identifier 421 during the phrase identification. If glossary terms for the user's particular textbook are not available, then glossary terms from a similar textbook can be used.

In some embodiments, the user provides the user's login information for a learning management system that the user's school uses. Examples of learning management system include Desire2Learn and BlackBoard. Upon receiving the user's login credentials for the learning management system, the user can select an input from the learning management system. For example, the user can select a powerpoint presentation or a word outline that the user's professor uploaded to the learning management system. The phrase identifier 421 can identify key phrases in the selected input, the relationship identifier 451 can identify relations between the identified key phrases and the output generator 481 can generate an output that provides the user with a conceptual overview of the powerpoint slides or the word outline. Advantageously, the user may obtain at least a broad conceptual understanding of the powerpoint slides without having to expend time in reading all the slides.

In some embodiments, the phrase identifier 421 uses information from a user's learning management system to identify key phrases. For example, the phrase identifier 421 can add terms from a course syllabus or a course outline to the vocabulary that is used when key phrases are being identified. Terms that appear in a course syllabus or a course outline are likely important. In some embodiments, phrases in the input that also appear in a course syllabus or a course outline can be identified as key phrases, regardless of the characteristic feature values associated with the phrases.

Figure 17:
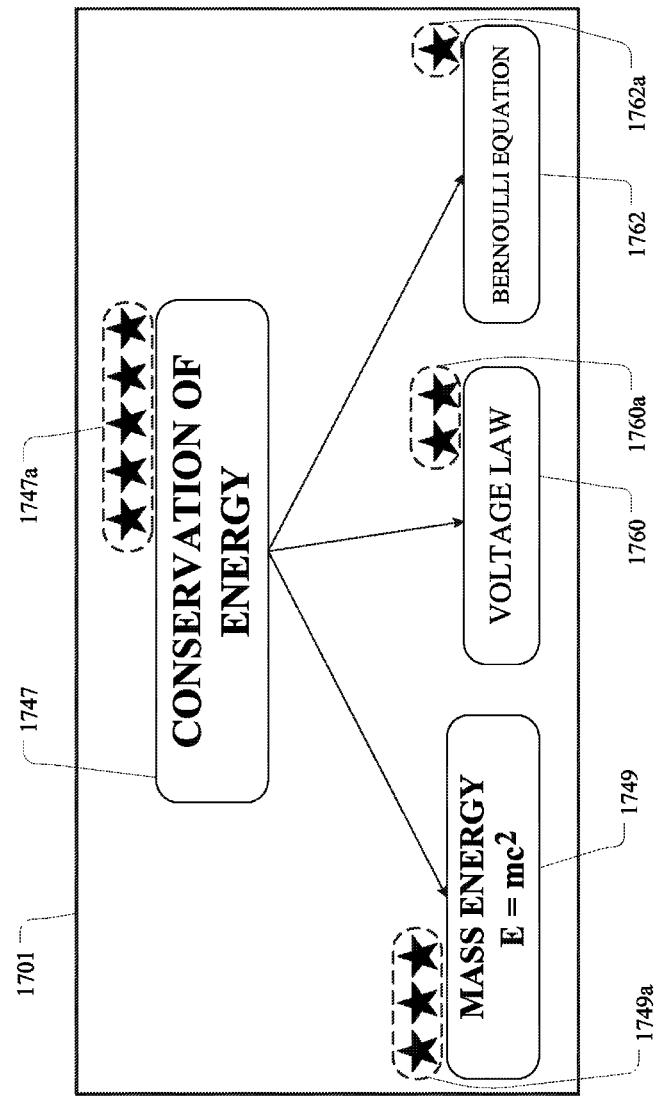
FIG. 17 is a diagram illustrating another example output where the relation between the key phrases is indicated by displaying another concept map along with example testability indicators.
Figure 18:
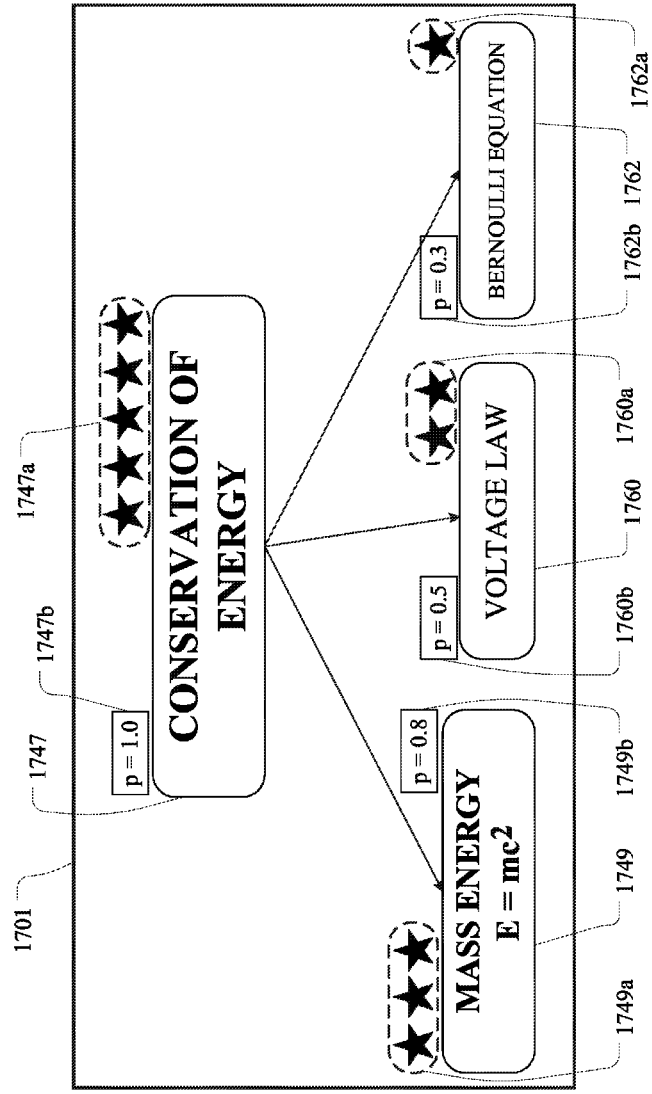
FIG. 18 is a diagram illustrating another example output where the relation between the key phrases is indicated by displaying another concept map along with other example testability indicators.

FIGS. 17A and 17B provide exemplary outputs that provide a conceptual overview of the input and emphasize concepts that can be more likely to be tested on a test or an exam.

FIG. 17A shows a user interface 1701. The user interface 1701 can display a concept map that includes a first phrase 1747, a second phrase 1749, a third phrase 1760 and a fourth phrase 1762. The user interface 1701 can display indicators indicating the likelihood of a concept being tested on a test or an exam. An indicator 1747a indicates that a concept represented by the first phrase 1747 is highly likely to be tested because the indicator 1747a includes five stars. An indicator 1749a indicates that a concept represented by the second phrase is likely to be tested because the indicator 1749a includes three stars. Indicators 1760a and 1762a indicate that concepts represented by phrases 1760 and 1762 are relatively less likely to be tested because indicators 1760a and 1762a include only two stars and one star, respectively. The size of font of the phrases 1747, 1749, 1760 and 1762 can also be used to indicate the importance of their corresponding underlying concepts, from a testability perspective. For example, the large font of the first phrase 1747 indicates that the concept underlying the first phrase 1747 is most likely to be tested or is most heavily tested. On the contrary, the relatively small font of the fourth phrase 1762 indicates that the concept underlying the fourth phrase 1762 is the least likely to be tested or has been tested the least in past tests and exams. In some embodiments, colors can also be used to indicate the likelihood of concepts being tested. For example, red can indicate most testable concepts, yellow can indicate medium testable concepts and green can indicate least testable concepts.

The testability of the concepts underlying the phrases can be determined by determining the number of times each phrase occurred in past tests or exams. For example, if "conservation of energy" or a slight variant of "conservation of energy" appeared fifty times within the last five years of tests whereas "mass energy" only appeared 30 times, then "conservation of energy" is more likely to be tested on a future test that the user is presently studying for. Therefore, five stars can be placed next to "conservation of energy" and only three stars can be place next to "mass energy", so that the user can spend more time understanding "conservation of energy" in order to maximize the user's score on the test.

In some embodiments, tests and exams from the same domain as the input can be searched for the key phrases. In some embodiments, only tests or exams from the user's school are searched. In some embodiments, only tests or exams prepared by the user's professor are searched. In some embodiments, the user can select whether to search for the key phrases in tests and exams from the user's school, from other schools, by the user's professor, or by other professors as well.

As mentioned earlier, the user's school, course, and professor can be provided by the user, for example through a user interface similar to the user interface 201 or 301. The user's school, course, and professor can also be determined through the user's learning management system. The user's school, course and professor may also be determined through the user's social networks, such as the user's Facebook account, Twitter account or LinkedIn account. The user can provide the login credentials of the user's social networking accounts, for example through a user interface similar to the user interface 201 or 301.

In an example embodiment, the most common concepts for some domains are searched in exams/tests from several schools/universities for exams proctored during several years. The number of occurrences of each concept can be stored in a database on a server. The database can store the number of occurrences of common concepts from each school for each year. The user can select the school, the professor, and the year range that can be used to generate the indicators 1747a, 1749a, 1760a, and 1762a.

FIG. 17B shows other indicators 1747b, 1749b, 1760b, and 1762b that indicate the probabilities of the concepts underlying the phrases 1747, 1749, 1760, and 1762, respectively, being tested. The probabilities can be generated by dividing the number of exams a phrase appeared in a given period by the total number of exams in the given period. By providing two indicators that indicate the likelihood of a concept being tested on a future exam, the user can prepare for the exam in a more efficient manner. For example, if the user is crunched for time, then the user can study the more likely to be tested concepts first and then the less likely to be tested concepts. An advantage of providing the probability indicators in addition to the stars indicators is that the user is better equipped to judge what concept the user should focus on first. The stars indicators can be skewed if a concept was heavily tested in one year but rarely tested in other years, whereas the probabilities indicator is less susceptible to such noise because of its averaging effect.

In preparing for tests and exams, some student users like to test themselves to assess their understanding of the materials. FIGS. 19 to 22 provide examples of how student users can test themselves to assess their understanding in preparation for a test or an exam.

Figure 19:
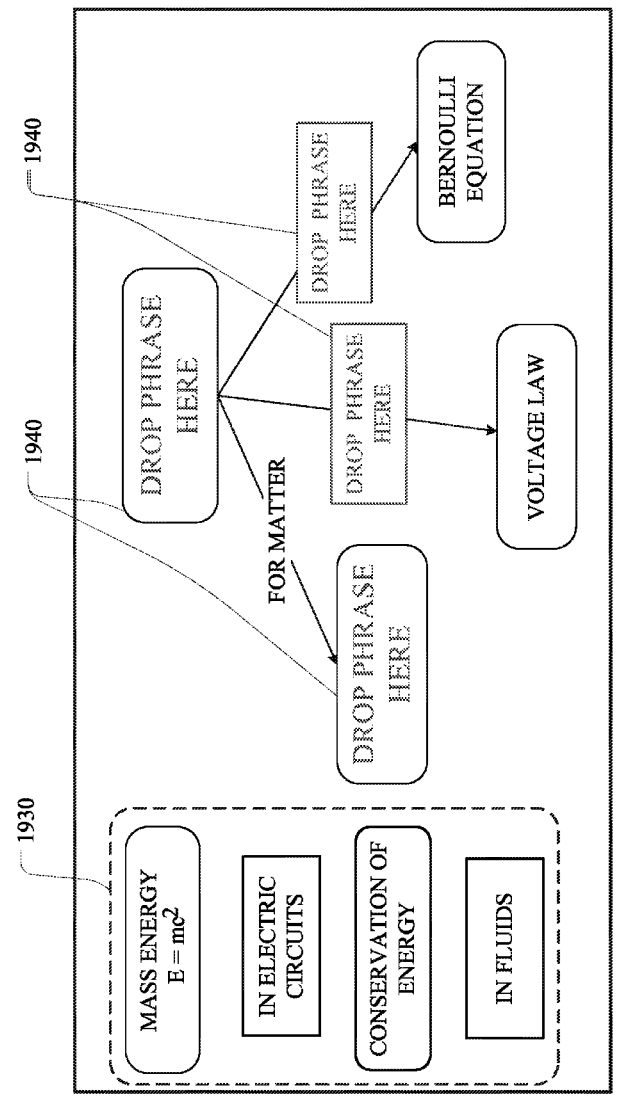
FIG. 19 is a diagram, similar to the diagram in FIG. 16, illustrating an example output concept map with unfilled text fields in order to test a user's conceptual understanding of the input

FIG. 19 shows a concept map that is similar in structure to the concept map shown in FIG. 16. However, phrases 1930 from the concept map have been selectively removed and the student user is being asked to place the phrases 1930 into the phrase holders 1940. The student user's task is to drag and drop each of the phrases 1930 into the correct phrase holders 1940, as shown in FIG. 16. The phrases 1930 can be removed from the concept map at random (i.e. in deciding which phrases should be removed, phrases can be selected randomly). The phrases 1930 can be removed from the concept map based on the testability of the phrases 1930. For example, phrases representing concepts that are most likely to be tested can be removed.

Figure 20:
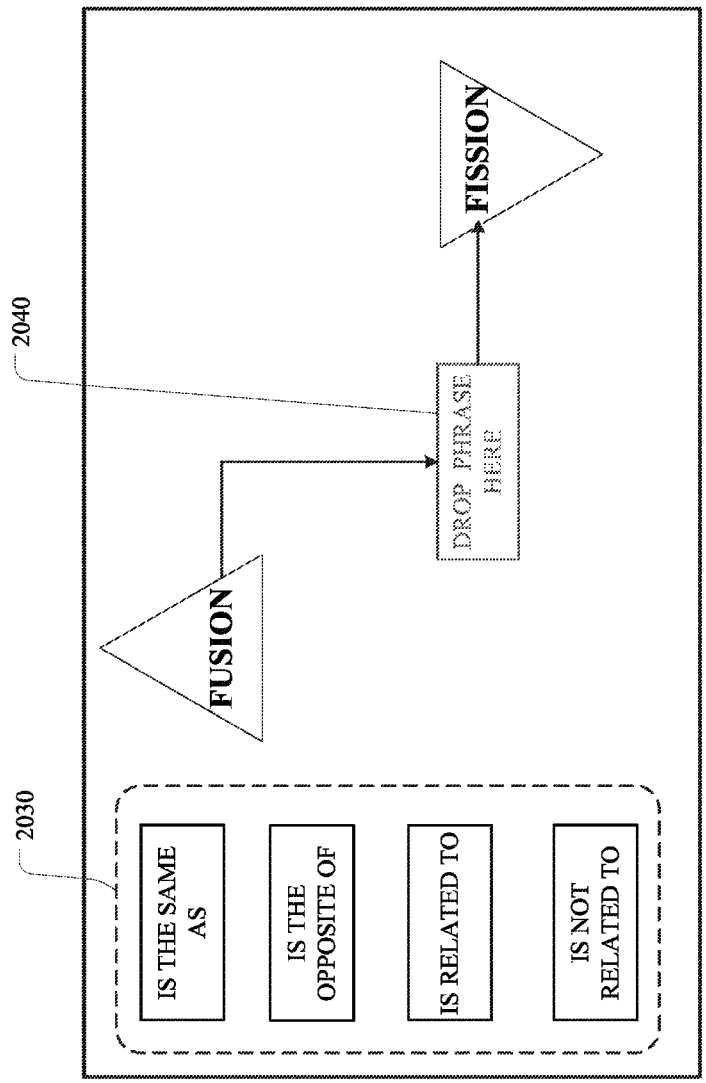
FIG. 20 is a diagram, similar to FIG. 9, illustrating an example output with unfilled text fields in order to test a user's conceptual understanding of the input.

FIG. 20 shows an output that is similar to the output shown in FIG. 9. However, the connecting phrase 980 has been removed and the student user is asked to drag and drop one of the phrases 2030 into the phrase placeholder 2040. The phrases 2030 include the correct connecting phrase 980 and other incorrect phrases that can be antonyms of the correct connecting phrase 980, or phrases that are unduly broader or narrower than the correct connecting phrase 980. Advantageously, the student user's understanding of the relation or the interaction between the two concepts, fusion and fission, is being tested.

Figure 21:
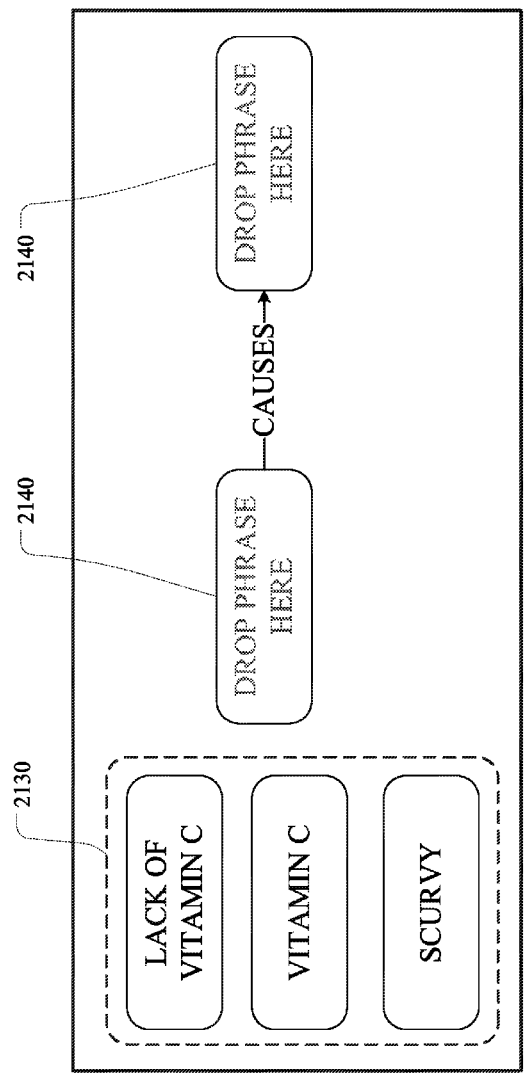
FIG. 21 is a diagram, similar to FIG. 10, illustrating an example output with unfilled text fields in order to test a user's conceptual understanding of the input.

FIG. 21 shows an output that is similar to the output shown in FIG. 10. However, the key phrases 1047 and 1049 have been removed and replace with phrase placeholders 2140. The student user is asked to drag and drop some of the phrases 2130 into the phrase placeholders 2140. The phrases 2130 can include phrases in addition to the correct phrases 1047 and 1049. The additional phrases can be antonyms or opposites of the correct phrases 1047 and 1049 to confuse the student user and test the student user's understanding of the causal relation between the key phrases 1047 and 1049.

Figure 22:
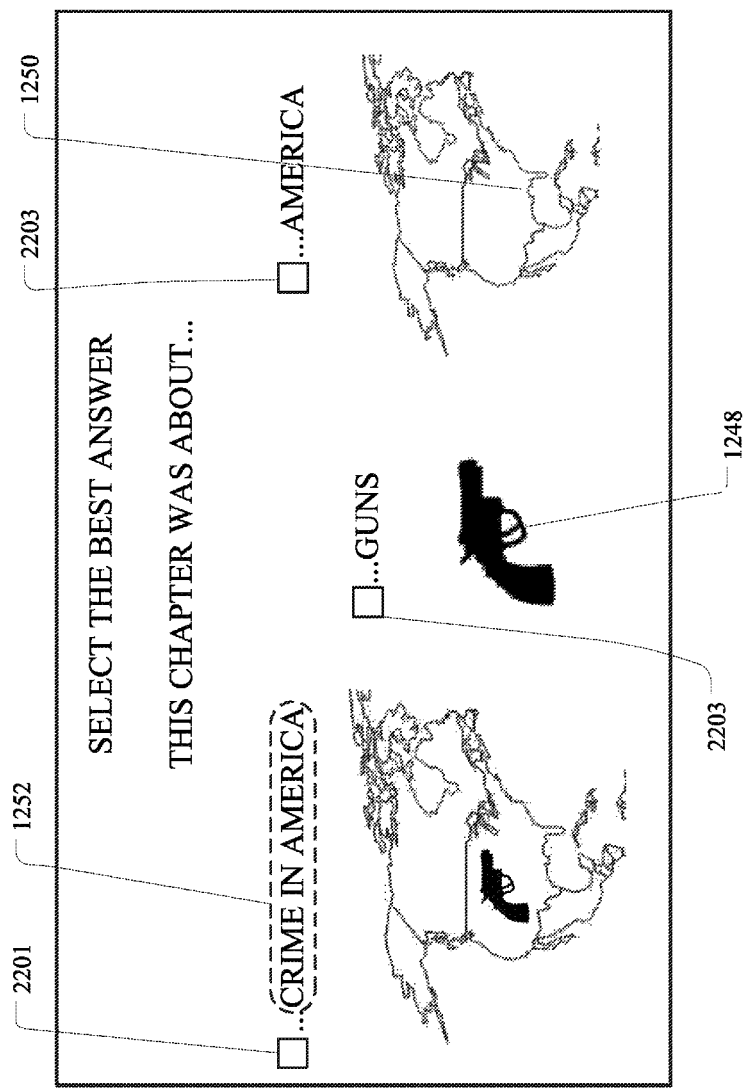
FIG. 22 is a diagram, with portions similar to FIG. 12, illustrating an example output a multiple choice question in order to test a user's conceptual understanding of the input.

FIG. 22 tests the user's understanding of the input corresponding with the output displayed in FIG. 12. The input related to "Crime in America" which is one of the options and can be selected through checkbox 2201. Others options include "guns" which can be selected by selecting checkbox 2203 and "America" which can be selected by selecting checkbox 2203. Although "gun" and "America" are partially correct because the input did mention "crime" which is related to "guns" and the input did mention "America", but "gun" and "America" are not the best answer because they are not represent the whole input. "Crime in America" accurately represents the whole input and therefore is the correct answer. Advantageously, multiple choice questions can be automatically generated to test the student's understanding of key concepts and the relation between the key concepts.

Unlike most traditional multiple choice and fill-in-the-blank questions, the types of questions generated in FIGS. 19-22 do not just test a student's ability to retain information but rather the student's ability to identify key concepts and the relations between the key concepts.

Other types of questions can also be generated. For example, once the phrase identifier 421 has identified key phrases in the input 401. Sentences from the input and with the identified key phrases can be displayed. However, instead of displaying the keyphrases, empty textboxes can be displayed and the student can be asked to type-in the correct key phrase. In this manner, fill-in-the blank type questions can be automatically generated to assess the student's retention.

In some embodiments, the phrase identifier 421, the relationship identifier 451 and the output generator 481 are all implemented on the apparatus 101. For example, the phrase identifier 421, the relationship identifier 451 and the output generator 481 can be implemented in a single software application that can be downloaded from a software application store, such as the App Store or the Google Play Store.

In some embodiments, the input can be received via the apparatus 101, for example through the web-based user interface 301. The input can then be sent to a server that implements the phrase identifier 421 and the relationship identifier 481. The server identifies key phrases in the input that the server receives. The server identifies a relation between the key phrases. The server can also determine how the key phrases and the relation between the key phrases can be presented. The server sends the key phrases, the relation between the key phrases and the type of output format that can be used. The apparatus 101 receives the key phrases, the relation between the key phrases and the output format that can be used. The apparatus 101 then outputs the key phrases, the relation between the key phrases through the output device 105 and using the output format that the apparatus 101 receives from the server.

Figure 23:
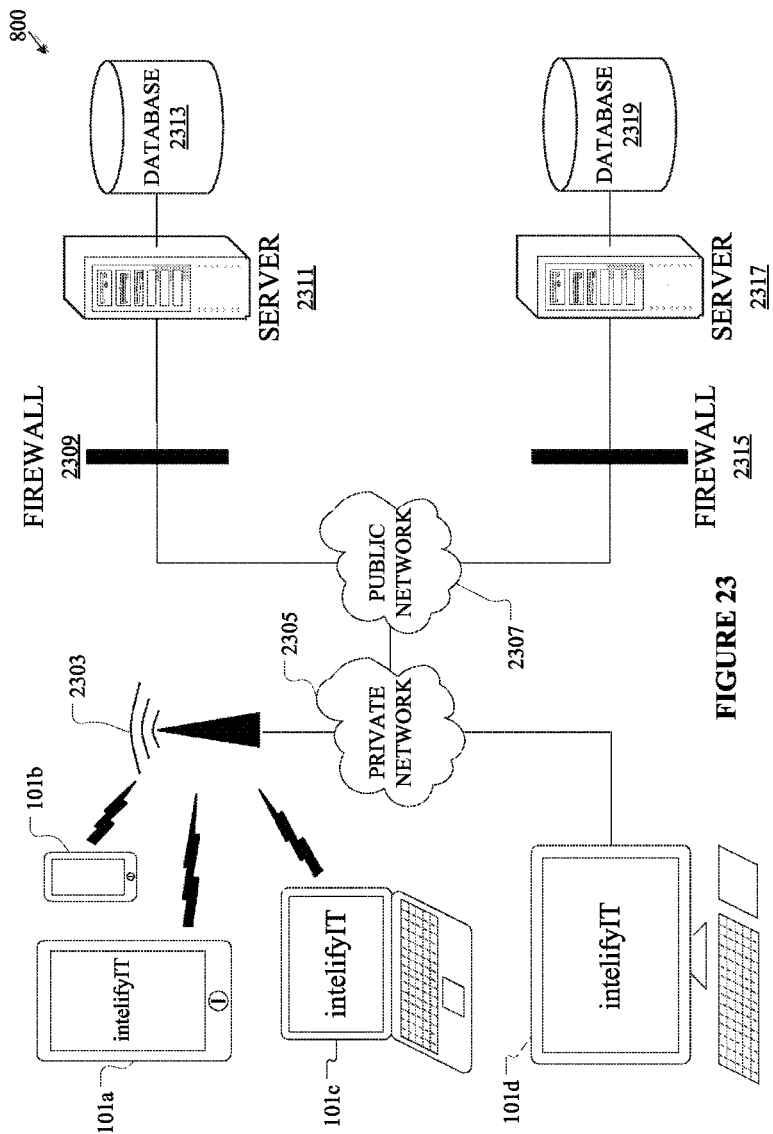
FIG. 23 is a diagram illustrating an example electronic communication system.

FIG. 23 shows a system 800 that includes a tablet 101a, a smartphone 101b, a laptop 101c, and a desktop computer 101d. The tablet 101a, the smartphone 101b, and the laptop 101c can communicate wirelessly to an access point 2303 that is connected to a private network 2305. The desktop computer 101d can be connected to the private network 2305 through a wire, such as an Ethernet cable. The private network 2305 is connected to a public network 2307, such as the internet. The tablet 101a, the smartphone 101b, the laptop 101c, and the desktop 101d can display user interfaces 201 and 301.

The devices 101a, 101b, 101c, and 101d can access a server 2311. The server 2311 can include a web server that can host a website, such as www.intelinotes.com or www.intelifyit.com or www.intelifybooks.com. There can be a firewall 2309 connected to the server 2311 to protect the server from malicious attacks. The server 2311 can be connected to a database 2313.

The devices 101a, 101b, 101c, 101d and the server 2311 can access another server 2317 via the public network 2307. Similar to the server 2311, the server 2317 can be connected to a firewall 2315 to protect the server 2317 from malicious attacks. Similar to the server 2311, the server 2317 can be connected to a database 2319.

In some embodiments, the phrase identifier 421 and the relationship identifier 451 can be implemented on the server 2311. Advantageously, the devices 101a, 101b, 101c, 101d are not burdened with the computationally and resource-intensive tasks of identifying phrases and identifying relations between the phrases.

Figure 24:
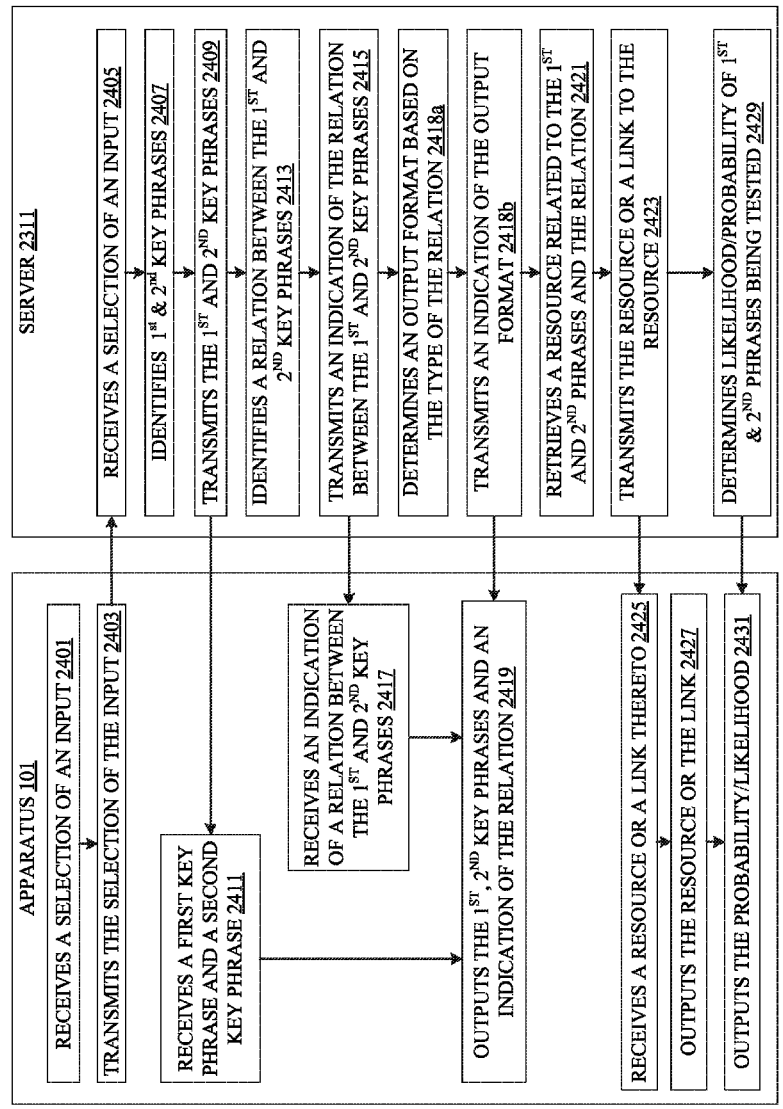
FIG. 24 is a flow diagram illustrating an example method performed by an apparatus and a server of the example electronic communication system of FIG. 23.

FIG. 24 shows the apparatus 101 and the server 2311. The apparatus 101 can include the tablet 101a, the smartphone 101b, the laptop 101c, and the desktop 101d.

At 2401, the apparatus 101 receives a selection of an input. The selection of the input can include the input in the form of a file, text, video, audio or an image, as discussed earlier. The selection of the input can include a selection of an input from several inputs that are available and stored on a server, for example the server 2311. For example, the user can select a file from an online notes marketplace repository or an ebook from an online ebook store repository.

At 2403, the selection of the input is transmitted to the server 2311. If the user provided a file, then the file can be transmitted to the server 2311. If the user selected a file or an ebook in an online repository, then the apparatus 101 transmits a link to the file or the ebook. If the user selected an ebook from an online ebook store, then the apparatus 101 can transmit the user's credentials for the online ebook store to the server 2311, so that the server 2311 can retrieve the selected file or ebook from the online ebook store. For example, if the user selected an ebook on googlebooks, then the user's login credentials for googlebooks can be transmitted to the server 2311. In another example, if the user selected a file on the user's googledrive account, then the user's login credentials for the googledrive account can be transmitted to the server 2311.

the server 2311 can retrieve the file or the ebook from the online repository. For example, the server 2311 can retrieve an ebook from googlebooks, an ebook from the webstore of a book publisher, or a file from googledrive, etc.

At 2405, the server 2311 receives a selection of an input. The server 2311 can receive a file that the user uploaded. The server 2311 can receive a link to a file or an ebook and the user's login credentials to access to the file or the ebook. For example, the server 2311 can receive a link a file on the user's googledrive account and the user's login credentials for the user's googledrive account. The server 2311 can use the login credentials to access the file on the user's googledrive account. Similarly, the server 2311 can receive login credentials for the user's googlebooks account, the user's learning management system account, or the user's account with a book publishing company, such as Thomson, Pearson and McGraw Hill. Upon receiving the login credentials for a particular account, the server 2311 can access the particular account and retrieve a file or an ebook from the account.

At 2407, the server 2311 can identify a first key phrase and a second key phrase in the input. The server 2311 can use the phrase identifier 421 to identify the first phrase 447 and the second phrase 449.

At 2409, the server 2311 can transmit the first phrase 447 and the second phrase 449 to the apparatus 101.

At 2411, the apparatus 101 can receive the first phrase 447 and the second phrase 449 from the server 2311.

At 2413, the server 2311 can identify a relation between the first phrase 447 and the second phrase 449. The server 2313 can use the relationship identifier 451 to identify the relation. The server 2313 can communicate with the server 2317 to identify the relation. The server 2317 can include a server of Wikipedia, dbpedia, WolframAlpha, or Wordnet. As discussed in regards to the relationship identifier 451, the server 2313 can query the server 2317 for terms related to the first phrase 447. The server 2313 can receive from the server 2317 phrases that are related to the first phrase 447 and if any of the phrases received from the server 2317 matches the second phrase 449, then there is a relation between the first phrase 447 and the second phrase 449, as discussed earlier.

At 2415, the server 2313 transmits an indication of the relation to the apparatus 101. The server 2313 can transmit the type of the relation. For example, the server 2313 can notify the apparatus that the first phrase 447 and the second phrase 449 are related through a hyponymous relation.

At 2417, the apparatus 101 receives an indication of a relation between the first phrase 447 and the second phrase 449.

At 2418a, the server 2313 can determine an output format that is suitable for outputting the first phrase 447, the second phrase 449 and indicating the relation between the phrases 447, 449. As discussed earlier, the output format can be selected based on the type of the relation. For example, hyponymous relations can be displayed through a concept map. The output format can also be selected based on the user's preferences that can be explicitly specified by the user and can be communicated to the server 2313 by the apparatus 101. The output format can also be selected based on the user's preference that can be automatically determined based on the user's social networks. The user's login credentials for the user's social networks can be provided by the user through the apparatus 101 and the apparatus 101 can communication the login credentials to the server 2311.

At 2418b, the server 2311 transmits an indication of the output format to the apparatus 101. The server 2311 can transmit generate the output and transmit the generated output to the apparatus 101. For example, the server 2311 can transmit a file that contains the output to the apparatus 101. The server 2311 can transmit instructions to the apparatus 101 on how to present the output. For example, the server 2311 can instruct the apparatus 101 to output audio through the output device 105 of the apparatus 101.

At 2419, the apparatus 101 can output the first phrase 447, the second phrase 449, and an indication of the relation between the phrases 447, 449. The output can be in the form of any of the output formats shown in FIGS. 8 to 22, any additional output formats discussed above or any other output format.

At 2421, the server 2311 can search for one or more resources related to the first phrase 447, the second phrase 449 and the relationship 479. As discussed earlier, the resources can include videos, audio, Wikipedia excerpts, web resources, journal resources, or any other resources that may help the user in understanding the concepts underlying the phrases and the relations between the phrases.

At 2423, the server 2311 can transmit the resource or a link to the resource to the apparatus 101. For example, the server 2311 can transmit an image or a link to the image.

At 2425, the apparatus 101 receives the resource or a link to the resource from the server 2311.

At 2427, the apparatus 101 can output the resource or the link to the resource. For example, the apparatus 101 can output the resources through the multimedia resource bars 890, 990, 1090, 1190, 1290, 1390, 1490, 1590, or 1690.

At 2429, the server 2311 can determine a probability or likelihood of the first phrase 447 and/or the second phrase 449 being tested on a future test or exam. In some embodiments, the database 2313 can include exams and tests that were administered at various schools and universities for numerous courses in the past. The server 2311 can access the database 2313 and determine the number of occurrences of the first phrase 447 and/or the second phrase 449 in the past exams and tests. The server 2311 can determine the number of occurrences by counting the number of occurrences in all the exams or only a subset of the exams. For example, as explained earlier, only exams from the same school or university as the user can be used to provide the user with an indication of how likely the concept is to be tested at the user's school. In another example, only exams written by the user's professor can be searched to provide even more accurate indicators of testability likelihood. In some embodiments, the database 2313 can include a lookup table that includes commonly tested concepts in various domains at various schools. The server 2311 can use the lookup table to determine the likelihood of a concept being tested. The server 2311 can transmit the likelihood or the probabilities to the apparatus 101.

At 2431, the apparatus 101 can receive the likelihoods or the probabilities and display indicators, such as 1747a and 1747b, to indicate the likelihood or probability of a concept being tested on a future test or exam.

Figure 25:
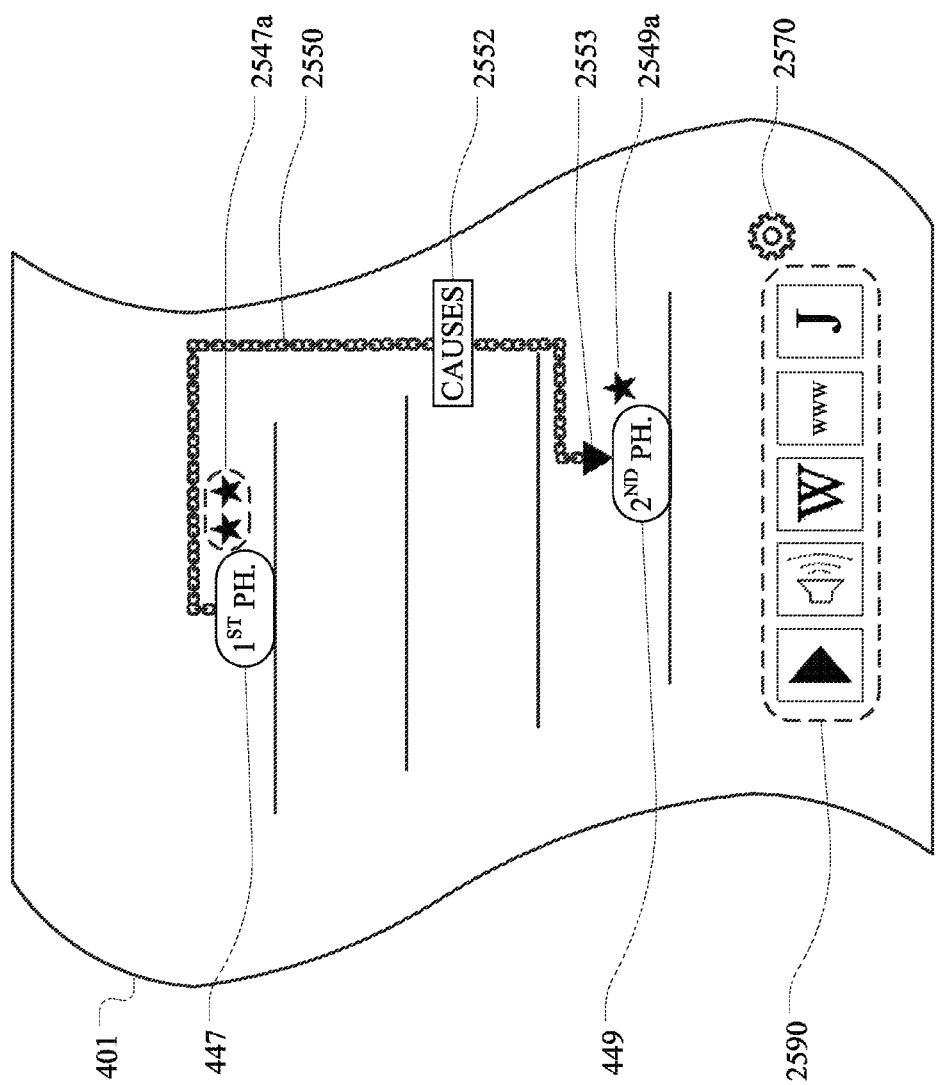
FIG. 25 is a diagram illustrating another example output where a first key phrase, a second key phrase and an indication of a relation between the first key phrase and the second key phrase are shown along with other phrases from the input.

FIG. 25 shows another exemplary output. There is shown the input 401. As explained earlier, the input 401 can include lecture notes, an ebook, etc. The first phrase 447 and the second phrase 449 have been annotated in the input. In FIG. 25, the first phrase 447 and the second phrase 449 can be enclosed with polygons. In some embodiments, the first phrase 447 and the second phrase 449 can be highlighted, shown in bold, or shown in a bigger font than rest of the phrases in the input 401. An indicator 2550 can be displayed to indicate the relation between the first phrase 447 and the second phrase 449. The indicator 2550 can include a chain to indicate a conceptual link between the first phrase 447 and the second phrase 449. In some embodiments, lines, arrows, asterisks or some symbols can be used to indicate a relation between the first phrase 447 and the second phrase 449. A connecting phrase 2552 can be displayed to indicate the type of the relation between the first phrase 447 and the second phrase 449. For example, "causes" indicates that there is a causal relation between the first phase 447 and the second phrase 449. The connecting phrase 2552 can be constructed or selected in a manner similar to the selection or construction of the caption 1252, the connecting phrase 1254, and the connecting phrase 1552, as explained earlier. An arrowhead 2553 can be displayed to further illustrate the causal relation between the first phrase 447 and the second phrase 449. The arrowhead 2553 illustrates that the first phrase 447 (e.g. "lack of Vitamin C") causes the second phrase 449 (e.g. "Scurvy").

A multimedia resource bar 2590 can be shown to present multimedia resources related to the first phrase 447, the second phrase 449 and the relation between the phrases 447 and 449. The multimedia resource bar 2590 can be configured by the user through configuration options 2570 that are similar to the configuration options 1270 as discussed above. Through the configuration options 2570 the multimedia resource bar 2590 can be configured to show resources that are primarily only related to the first phrase 447, for example resources on Vitamin C. Resources that are primarily only related to the first phrase 447 (e.g. "Vitamin C") can be retrieved by searching resource databases using the first phrase 447 or a variation of the first phrase 447 (e.g. "Vitamin C"). Through the configuration options 2570, the multimedia resource bar 2590 can be configured to show resources that are primarily only related to the second phrase 449. Resources that are primarily only related to the second phrase 449 (e.g. "Scurvy") can be retrieved by searching resource databases using the second phrase 449 or a variation of the second phrase 449 (e.g. "Scurvy"). Through the configuration options 2570, the multimedia resource bar 2590 can be configured to show resources that are related to both the first phrase 447 and the second phrase 449 and the relation between the first phrase 447 and the second phrase 449. Resources that are retrieved based on the relation between the first phrase 447 and the second phrase 449 can be retrieved by searching resource databases using the a concatenation of the first phrase 447, the connecting phrase 2552, and the second phrase 449 (e.g. "lack of Vitamin C causes Scurvy").

In some embodiments, indicators indicating the likelihood or the probability of concepts being tested on a test or an exam can also be displayed within the input 401. The indicators 2547a and 2549a indicate the likelihood of the first phrase 447 and the second phrase 449 being tested on a test or an exam. The indicator 2547a can include two stars to indicate that the concept underlying the first phrase 447 is relatively more likely to be tested that the concept underlying the second phrase because the indicator 2549a only includes one star. As explained earlier, the likelihood of a phrase being tested can be determined by counting the number of occurrences of the phrase in tests and exams from previous years.

Although the above has been described with reference to certain specific embodiments, various modifications can be made thereto without departing from the scope of the claims.

What is claimed is:

1. An electronic communication apparatus comprising:
   an input device;
   an output device;
   a memory;
   a communication device; and
   a processor that executes instructions stored in the memory that, when executed by the processor, cause the processor to:
   display a user interface via the output device;
   receive an input via the input device;
   identify a first key phrase in the input, wherein the processor is configured to identify the first key phrase in response to a first occurrence of the first key phrase being within a first twenty-five percent of the input and a last occurrence of the first key phrase being within a last twenty-five percent of the input;
   identify a second key phrase in the input;
   identify a relation between the first key phrase and the second key phrase;
   output the first key phrase via the output device;
   output the second key phrase via the output device; and
   output a relation indicator to indicate the relation between the first key phrase and the second key phrase.

2. The electronic communication apparatus of claim 1, wherein the processor is further configured to identify a domain corresponding with the input, and identify the first key phrase in response to the first key phrase matching a phrase stored in a vocabulary corresponding with the domain.

3. The electronic communication apparatus of claim 1, wherein the processor is configured to identify the second key phrase by
   querying a lexical database for cognitive synonyms of the first key phrase,
   receiving a plurality of cognitive synonyms of the first key phrase from the lexical database, and
   identifying a phrase in the input as the second key phrase in response to the phrase matching with one of the plurality of cognitive synonyms of the first key phrase.

4. The electronic communication apparatus of claim 3, wherein the cognitive synonyms of the first key phrase comprise one or more of a hypernym, a hyponym, a holonym, a meronym, a sister term, a derivationally related phrase and a synonym of the first key phrase.

5. The electronic communication apparatus of claim 1, wherein the relation comprises a semantic relation.

6. The electronic communication apparatus of claim 1, wherein the processor is configured to identify the relation between the first key phrase and the second key phrase by
   requesting a lexical database for cognitive synonyms of the first key phrase,
   receiving one or more cognitive synonyms of the first key phrase from the lexical database,
   determining whether the second key phrase matches at least one of the cognitive synonyms of the first key phrase, and
   establishing a relation between the first key phrase and the second key phrase in response to the second key phrase matching one of the cognitive synonyms of the first key phrase.

7. The electronic communication apparatus of claim 1, wherein the processor is configured to identify the relation between the first key phrase and the second key phrase as at least one of:
   a hyponymous relation, in response to the second key phrase matching a hyponym of the first key phrase;
   a meronymy relation, in response to the second key phrase matching a meronym of the first key phrase;
   a holonymy relation, in response to the second key phrase matching a holonym of the first key phrase;
   an antonymy relation, in response to the second key phrase matching an antonym of the first key phrase;
   a homonymy relation, in response to the second key phrase matching a homonym of the first key phrase;
   a hypernymous relation, in response to the second key phrase matching a hypernym of the first key phrase;
   a synonymy relation, in response to the second key phrase matching a synonym of the first key phrase;
   a locative relation, in response to the first key phrase matching a location and the second key phrase matching an entity in or adjacent to the location;
   a temporal relation, in response to the first key phrase matching a time or a time period and the second key phrase matching an event that occurred within the time period or proximate to the time period or the time;
   a causal relation, in response to the first key phrase matching a trigger condition and the second key phrase matching a result condition resulting from the trigger condition; and
   an instance-of relation, in response to the second key phrase matching an entity that is an instance of an entity associated with the first key phrase.

8. The electronic communication apparatus of claim 1, wherein the output device comprises a display; and wherein the processor is configured to
   display a portion of the input including the first key phrase, the second key phrase and other phrases in the input,
   annotate the first key phrase and the second key phrase so that the first key phrase and the second key phrase appear different from the other phrases of the input that are displayed, and
   display the relation indicator indicating the relation between the first key phrase and the second key phrase.

9. The electronic communication apparatus of claim 1, wherein the relation indicator comprises a relation string; and wherein the processor is further configured to select the relation string from a plurality of relation strings by selecting the relation string that corresponds with the relation between the first key phrase and the second key phrase.

10. The electronic communication apparatus of claim 1, wherein the output device comprises a display; and wherein the processor is configured to display at least one of:
    a concept map in response to the relation including at least one of a hyponymous relation, a hypernymous relation, an instance-of relation, a meronymy relation, a holonymy relation, a paradigmatic relation, or a relation between a possessor and an object possessed by the possessor;
    a Venn diagram in response to the relation including at least one of a meronymy relation, a holonymy relation, a hypernymous relation and a hyponymous relation;
    in response to the relation including a locative relation, a map with an object overlapping the map, the map corresponding with the first key phrase and the object overlapping the map corresponding with the second key phrase;
    a timeline in response to the relation including a temporal relation;
    a flow diagram including at least one arrowhead in response to the relation including a causal relation; and
    in response to the relation including at least one of a meronymy relation and a holonymy relation, an image, the image corresponding with the first key phrase, and a portion of the image corresponding with the second key phrase.

11. The electronic communication apparatus of claim 1, wherein the processor is further configured to
    determine whether the first key phrase matches a phrase in an exam data store, and
    display a testability indicator in response to the first key phrase matching a phrase in the exam data store.

12. The electronic communication apparatus of claim 1, wherein the processor is further configured to
    select a relation string, from a plurality of relation strings, corresponding with the relation between the first key phrase and second key phrase;
    concatenate the first key phrase, the selected relation string and the second key phrase to form a concatenated string;
    query a resource data store for a resource using the concatenated string;
    receive the resource from the resource data store; and
    output the resource via the output device.

13. The electronic communication apparatus of claim 1, wherein the output device comprises a display; wherein the input device comprises a front-facing camera; and wherein the processor is further configured to
    display a portion of the input on the display,
    use the front-facing camera to track movement of eyes of a user viewing the input, measure an amount of time the user spends viewing a phrase, and identify the phrase as the first key phrase when the amount of time exceeds a threshold time.

14. A computer-implemented method comprising:
displaying a user interface via an output device;
receiving a selection of an input via an input device;
displaying a portion of the input on a display of the output device;
tracking, via a front-facing camera of the input device, movement of eyes of a user viewing the input on the display;
measuring an amount of time the user spends viewing a phrase
transmitting, via a communication device, the selection of the input and the amount of time to a server;
receiving, via the communication device, a first key phrase from the input, a second key phrase from the input, and indicia of a relation between the first key phrase and the second key phrase; and
outputting, via the output device, the first key phrase, the second key phrase, and a relation indicator to indicate the relation between the first key phrase and the second key phrase.

15. The computer-implemented method of claim 14, further comprising:
receiving, via the user interface, a domain identifier identifying a domain corresponding with the input; and
transmitting the domain identifier to the server.

16. The computer-implemented method of claim 14, wherein the outputting comprises:
displaying a portion of the input including the first key phrase, the second key phrase and other phrases in the input;
annotating the first key phrase and the second key phrase so that the first key phrase and the second key phrase appear different from the other phrases of the input that are displayed; and
displaying the relation indicator indicating the relation between the first key phrase and the second key phrase.

17. The computer-implemented method of claim 14, wherein outputting the relation indicator comprises outputting a relation string that corresponds with the relation between the first key phrase and the second key phrase.

18. The computer-implemented method of claim 14, wherein the outputting comprises displaying at least one of:
a concept map in response to the relation including at least one of a hyponymous relation, a hypernymous relation, an instance-of relation, a meronymy relation, a holonymy relation, a paradigmatic relation, or a relation between a possessor and an object possessed by the possessor;
a Venn diagram in response to the relation including at least one of a meronymy relation, a holonymy relation, a hypernymous relation and a hyponymous relation;
in response to the relation including a locative relation, a map with an object overlapping the map, the map corresponding with the first key phrase and the object overlapping the map corresponding with the second key phrase;
a timeline in response to the relation including a temporal relation;
a flow diagram including at least one arrowhead in response to the relation including a causal relation; and
in response to the relation including at least one of a meronymy relation and a holonymy relation, an image, the image corresponding with the first key phrase, and a portion of the image corresponding with the second key phrase.

19. The computer-implemented method of claim 14, further comprising:
receiving indicia indicating testability of the first key phrase; and
displaying a testability indicator to indicate the testability of the first key phrase.

20. The computer-implemented method of claim 14, further comprising:
receiving a resource related to the relation between the first key phrase and the second key phrase; and
outputting the resource via the output device.

21. A computer-implemented method comprising:
receiving a selection of an input via a communication device;
displaying at least a portion of the input via an output device;
receiving, via the communication device, a measurement of an amount of time the user spends viewing a phrase in the input;
identifying, by a processor, the phrase as a first key phrase when the amount of time exceeds a threshold time;
identifying, by the processor, a second key phrase in the input;
identifying, by the processor, a relation between the first key phrase and the second key phrase; and
transmitting, via the communication device, the first key phrase, the second key phrase and indicia indicating the relation between the first key phrase and the second key phrase.

22. The computer-implemented method of claim 21, further comprising:
identifying a domain corresponding with the input; and
identifying the first key phrase in response to the first key phrase matching a phrase stored in a vocabulary corresponding with the domain.

23. The computer-implemented method of claim 21, wherein identifying the first key phrase comprises identifying the first key phrase in response to a first occurrence of the first key phrase being within a first twenty-five percent of the input and a last occurrence of the first key phrase being within a last twenty-five percent of the input.

24. The computer-implemented method of claim 21, wherein identifying the second key phrase comprises:
querying a lexical database for cognitive synonyms of the first key phrase;
receiving a plurality of cognitive synonyms of the first key phrase from the lexical database; and
identifying a phrase in the input as the second key phrase in response to the phrase matching with one of the plurality of cognitive synonyms of the first key phrase.

25. The computer-implemented method of claim 24, wherein the cognitive synonyms of the first key phrase comprise one or more of a hypernym, a hyponym, a holonym, a meronym, a sister term, a derivationally related phrase and a synonym of the first key phrase.

26. The computer-implemented method of claim 21, wherein identifying the relation comprises:
requesting a lexical database for cognitive synonyms of the first key phrase,
receiving one or more cognitive synonyms of the first key phrase from the lexical database,
determining whether the second key phrase matches at least one of the cognitive synonyms of the first key phrase, and establishing a relation between the first key phrase and the second key phrase in response to the second key phrase matching one of the cognitive synonyms of the first key phrase.

27. The computer-implemented method of claim 21, wherein identifying the relation comprises identifying the relation as at least one of:
- a hyponymous relation, in response to the second key phrase matching a hyponym of the first key phrase;
- a meronymy relation, in response to the second key phrase matching a meronym of the first key phrase;
- a holonymy relation, in response to the second key phrase matching a holonym of the first key phrase;
- an antonymy relation, in response to the second key phrase matching an antonym of the first key phrase;
- a homonymy relation, in response to the second key phrase matching a homonym of the first key phrase;
- a hypernymous relation, in response to the second key phrase matching a hypernym of the first key phrase;
- a synonymy relation, in response to the second key phrase matching a synonym of the first key phrase;
- a locative relation, in response to the first key phrase matching a location and the second key phrase matching an entity in or adjacent to the location;
- a temporal relation, in response to the first key phrase matching a time or a time period and the second key phrase matching an event that occurred within the time period or proximate to the time period or the time;
- a causal relation, in response to the first key phrase matching a trigger condition and the second key phrase matching a result condition resulting from the trigger condition; and
- an instance-of relation, in response to the second key phrase matching an entity that is an instance of an entity associated with the first key phrase.

28. The computer-implemented method of claim 21, wherein the indicia comprises a relation string, the method further comprising selecting the relation string from a plurality of relation strings by selecting the relation string that corresponds with the relation between the first key phrase and the second key phrase.

29. The computer-implemented method of claim 21, wherein the transmitting comprises transmitting at least one of:
- a concept map in response to the relation including at least one of a hyponymous relation, a hypernymous relation, an instance-of relation, a meronymy relation, a holonymy relation, a paradigmatic relation, or a relation between a possessor and an object possessed by the possessor;
- a Venn diagram in response to the relation including at least one of a meronymy relation, a holonymy relation, a hypernymous relation and a hyponymous relation;
- in response to the relation including a locative relation, a map with an object overlapping the map, the map corresponding with the first key phrase and the object overlapping the map corresponding with the second key phrase;
- a timeline in response to the relation including a temporal relation;
- a flow diagram including at least one arrowhead in response to the relation including a causal relation; and
- in response to the relation including at least one of a meronymy relation and a holonymy relation, an image, the image corresponding with the first key phrase, and a portion of the image corresponding with the second key phrase.

30. The computer-implemented method of claim 21, further comprising:
- determining whether the first key phrase matches a phrase in an exam data store, and
- transmitting a testability indicator in response to the first key phrase matching a phrase in the exam data store.

31. The computer-implemented method of claim 21, further comprising:
- selecting a relation string, from a plurality of relation strings, the selected relation string corresponding with the relation between the first key phrase and second key phrase;
- concatenating the first key phrase, the selected relation string and the second key phrase to form a concatenated string;
- querying a resource data store for a resource using the concatenated string;
- receiving the resource from the resource data store; and
- outputting the resource via the output device.

* * * * *